United States Patent
Palnitkar et al.

(10) Patent No.: US 8,032,939 B2
(45) Date of Patent: Oct. 4, 2011

(54) METHOD AND SYSTEM FOR PROVIDING WIRELESS VULNERABILITY MANAGEMENT FOR LOCAL AREA COMPUTER NETWORKS

(75) Inventors: Samir Palnitkar, Ashburn, VA (US); Vivek Bhagwat, Pune, IN (US)

(73) Assignee: AirTight Networks, Inc., Mountain View, CA (US)

( * ) Notice: Subject to any disclaimer, the term of this patent is extended or adjusted under 35 U.S.C. 154(b) by 888 days.

(21) Appl. No.: 11/956,357

(22) Filed: Dec. 14, 2007

(65) Prior Publication Data

US 2009/0119776 A1 May 7, 2009

Related U.S. Application Data

(63) Continuation-in-part of application No. 11/954,007, filed on Dec. 11, 2007.

(60) Provisional application No. 60/985,652, filed on Nov. 6, 2007.

(51) Int. Cl.
*G06F 21/00* (2006.01)
*G06F 11/30* (2006.01)
*G06F 15/16* (2006.01)
*G06F 17/00* (2006.01)

(52) U.S. Cl. .................. 726/25; 709/224; 705/400

(58) Field of Classification Search .................. None
See application file for complete search history.

(56) References Cited

U.S. PATENT DOCUMENTS

| 6,049,789 | A | * | 4/2000 | Frison et al. ................. 705/59 |
| 7,002,943 | B2 | | 2/2006 | Bhagwat et al. |
| 7,058,796 | B2 | | 6/2006 | Lynn et al. |
| 7,181,769 | B1 | * | 2/2007 | Keanini et al. ................. 726/23 |
| 7,277,404 | B2 | | 10/2007 | Tanzella et al. |
| 7,508,799 | B2 | * | 3/2009 | Sumner et al. ................. 370/338 |
| 7,577,424 | B2 | * | 8/2009 | Sinha et al. ................. 455/410 |
| 7,594,273 | B2 | * | 9/2009 | Keanini et al. ................. 726/25 |
| 2003/0217289 | A1 | | 11/2003 | Ammon et al. |
| 2004/0209634 | A1 | | 10/2004 | Hrastar |
| 2005/0174961 | A1 | | 8/2005 | Hrastar |
| 2005/0278777 | A1 | * | 12/2005 | Loza ................. 726/4 |
| 2007/0142030 | A1 | | 6/2007 | Sinha et al. |
| 2009/0320138 | A1 | * | 12/2009 | Keanini et al. ................. 726/25 |
| 2011/0131644 | A1 | * | 6/2011 | Keanini et al. ................. 726/11 |

FOREIGN PATENT DOCUMENTS

EP         0068525 A2  *  6/2009

* cited by examiner

*Primary Examiner* — Christopher Revak
(74) *Attorney, Agent, or Firm* — AirTight Networks; Hemant M. Chaskar

(57) ABSTRACT

A Software-as-a-Service (SaaS) based method for providing wireless vulnerability management for local area computer networks. The method includes providing a security server being hosted by a service provider entity to provide analysis of data associated with wireless vulnerability management for a plurality of local area computer networks of a plurality of customer entities, respectively. The method includes creating a workspace for wireless vulnerability management for a customer entity on the security server and receiving configuration information associated with the workspace. The method also includes supplying one or more sniffers to the customer entity. The method includes receiving at the security server information associated with wireless activity monitored by the one or more sniffers at premises of the customer entity and processing the received information within the workspace for the customer entity using the security server. The method includes metering usage of the workspace for wireless vulnerability management for the customer entity.

19 Claims, 20 Drawing Sheets

Authorized WLAN Setup

Specify the policies for your WLAN setup. [i]

This screen allows you to specify the details of the Authorized Wi-Fi setup at this location. The system uses this information to detect the presence of any Mis-configured or Rogue APs on your network. You can specify the various wireless settings used for every authorized SSID and the wired network(s) to which the APs with those SSID should connect. APs connected to the wrong network can pose significant security risks. The policies defined on this screen allow the system to correctly classify the APs at this location.

○ This is a No Wi-Fi location. (No Authorized Wi-Fi APs are installed at this location) ← 301
◉ Wi-Fi is allowed at this location. (Specify the details of Authorized Wi-Fi APs below) ← 302

| Specify Authorized SSIDs | Select No Wi-Fi Networks |

Specify the SSIDs that Authorized APs are allowed to have at this location. For each SSID, you can specify a detailed configuration template attached to that SSID. This template will be used to determine whether an AP at this location is a mis-configured or a rogue AP.

Add Authorized SSIDs

Add SSIDs for authorized APs at this location. For each SSID, you will be prompted to create an SSID template where you can specify detailed configuration for that SSID. SSID templates are shown in table below.

◉ Add Authorized SSID [ SSID-XYZ ] ← 303

[Add New SSID]

SSID Templates

The table below shows all SSID templates that are available at this location. A new AP or an existing Authorized AP will be compared against the applied SSID templates to determine if it is rogue or mis-configured. SSID templates that were created at another location can be applied to this location but cannot be edited or deleted.

| SSID | Guest SSID? | Template Name | Apply Here? |
|------|-------------|---------------|-------------|
|      |             |               |             |

[Apply] [Cancel]

Notification Configuration

| Display | Email | Reports | Severity | Event | Number of Notification Selected | Cost of Notification |
|---|---|---|---|---|---|---|
| ☑ | ☐ | ☑ | High ▸ | Rogue AP detected | 2 | 6 |
| ☑ | ☑ | ☑ | Medium ▸ | Authorized AP misconfiguration detected | 1 | 2 |
| ☐ | ☐ | ☐ | Medium ▸ | MAC spoofing detected | 3 | 6 |
| ☑ | ☐ | ☑ | Low ▸ | Ad hoc network detected | 2 | 2 |
| | | | | Total Cost of Notification | | 16 |

422  424  426  428  430  432

[Apply] [Cancel]

Severity    Cost per Notification
High        : 3
Medium      : 2
Low         : 1

| Report Configuration | 442 | 444 | 446 |
|---|---|---|---|
| Report Name | | Report Description | Report Delivery Schedule |
| AP Report | | This report contains AP information | Every Friday 5:00 pm by Email |

454A 454B 454C

[Add Report] [Edit Report] [Delete Report]

448

[Add Schedule] [Edit Schedule] [Cancel Schedule]

List of Sections

| Section Name | Section Description | Section Query Type |
|---|---|---|
| Rogue APs | This will show Rogue APs | Device Query |
| Authorized APs | This will show Authorized APs | Device Query |

452A 452B 452C

[Add Section to Report] [Edit Section] [Delete Section]

440

450

Section Information

Section Name *: Mis-configured APs

Section Description *: This will show Authorized APs that are or have been mis-configured Section Query Type: Device Query ▸  Select Device Type to include in Results: ☑ AP ☐ Client ☐ Sensor

462

Section Query (Database Query Logic Used to Construct Section)

Device Folder ▸ is equal to ▸ Authorized AP ▸ OR Delete

AND

AP Settings  not equal to  Specified Policy

| Selected Location: | Visible APs at // Customer Name / City 1 / Building 2 | | | | | |
|---|---|---|---|---|---|---|
| APs | Clients | Connections | | | | |
| Active / Inactive | MAC Address | Security | SSID | Channel | Protocol | Up/Down Since |
| A | 00:18:4D:C5:13D:BF | WEP | Retail AP | 6 | b/g | Nov 01,2007 |
| I | 00:0B:85:55:2B:B6 | 802.11i | W60N | 157 | a | Nov 05,2007 |
| I | 00:02:B5:55:17:F8 | Open | --- | 3 | b/g | Nov 30,2007 |

Figure 5

METHOD AND SYSTEM FOR PROVIDING WIRELESS VULNERABILITY MANAGEMENT FOR LOCAL AREA COMPUTER NETWORKS

CROSS-REFERENCES TO RELATED APPLICATIONS

This present application claims priority to commonly owned U.S. Provisional Application No. 60/985,652, entitled "Hosted Wireless Vulnerability Assessment Service and Related Methods and Systems", filed on Nov. 6, 2007, which is hereby incorporated by reference herein. This present application is a continuation in part of commonly owned U.S. patent application Ser. No. 11/954,007, entitled "Method and System for Providing Wireless Vulnerability Management for Local Area Computer Networks", filed on Dec. 11, 2007, which is hereby incorporated by reference herein, which in turn claims priority to commonly owned U.S. Provisional Application No. 60/985,652, entitled "Hosted Wireless Vulnerability Assessment Service and Related Methods and Systems", filed on Nov. 6, 2007, which is hereby incorporated by reference herein.

BACKGROUND OF THE INVENTION

The present invention relates generally to wireless computer networking techniques. More particularly, the invention provides a method and a system for providing wireless vulnerability management for local area computer networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", Bluetooth, and others.

Computer systems proliferated from academic and specialized science applications to day to day business, commerce, information distribution, and home applications. Such systems include personal computers, which are often called "PCs" for short, to large mainframe and server class computers. Powerful mainframe and server class computers run specialized applications for banks, small and large companies, e-commerce vendors, and governments. Smaller personal computers can be found in many if not all offices, homes, and even local coffee shops. These computers interconnect with each other through computer communication networks based on packet switching technology such as the Internet protocol (IP). The computer systems located within a specific local geographic region such as office, home, retail outlet, or other indoor and outdoor premises interconnect using a Local Area Network, commonly called, LAN. Ethernet is by far the most popular networking technology for LANs. The LANs interconnect with each other using a Wide Area Network called "WAN" such as the famous Internet. The LANs are typically coupled to the Internet through firewalls. The LANs are typically considered as private networks, while the Internet is considered as a public network. Although much progress occurred with computers and networking, we now face a variety of security threats on many computing environments from the hackers connecting to the computer network in an unauthorized fashion. The application of wireless communication to computer networking further accentuates these threats.

As merely an example, the conventional LAN is usually deployed using an Ethernet based infrastructure comprising cables, hubs switches, and other elements. A number of connection ports (e.g., Ethernet ports) are used to couple various computer systems to the LAN. A user can connect to the LAN by physically attaching a computing device such as laptop, desktop or handheld computer to one of the connection ports using physical wires or cables. Other computer systems such as database computers, server computers, routers and Internet gateways also connect to the LAN to provide specific functionalities and services. Once physically connected to the LAN, the user often accesses a variety of services such as file transfer, remote login, email, word wide web, database access, and voice over IP. Security of the LAN often occurs by controlling access to the physical space where the LAN connection ports are located.

Although conventional wired networks using Ethernet technology proliferated, wireless communication technologies are increasing in popularity. That is, wireless communication technologies wirelessly connect users to the computer communication networks. A typical application of these technologies provides wireless access to the local area network in the office, home, public hot-spots, and other geographical locations. As merely an example, the IEEE 802.11 family of standards, commonly called WiFi, is the common standard for such wireless application. Among WiFi, the 802.11b standard-based WiFi often operates at 2.4 GHz unlicensed radio frequency spectrum and can offer wireless connectivity at speeds up to 11 Mbps. The 802.11g compliant WiFi can offer even faster connectivity up to 54 Mbps and can operate at 2.4 GHz unlicensed radio frequency spectrum. The 802.11a can provide speeds up to 54 Mbps operating in the 5 GHz unlicensed radio frequency spectrum. The 802.11n can provide speeds up to 600 Mbps using techniques such as channel bonding and MIMO (multiple input multiple output). The WiFi enables a quick and effective way of providing wireless extension to the conventional wired LAN.

In order to provide wireless extension of the LAN using WiFi, one or more WiFi access points (APs) connect to the LAN connection ports either directly or through intermediate equipment such as WiFi switch. A user now wirelessly connects to the LAN using a device equipped with WiFi radio, commonly called wireless station, wireless client, or simply station or client, which communicates with the AP. The connection is free from cable and other physical encumbrances and allows the user to "Surf the Web", check e-mail or use enterprise computer applications in an easy and efficient manner. Unfortunately, certain limitations still exist with WiFi. That is, the radio waves often cannot be contained in the physical space bounded by physical structures such as the walls of a building. Hence, wireless signals often spill outside the area of interest. Unauthorized users can wirelessly connect to the AP and hence gain access to the LAN from the spillage areas such as the street, parking lot, and neighbor's premises. Consequently, the conventional security measure of controlling access to the physical space where the LAN connection ports are located is now inadequate.

In order to prevent unauthorized access to the LAN over WiFi, the AP can employ certain techniques. For example, the user is required to carry out authentication handshake with the AP (or a WiFi switch that resides between the AP and the LAN) before being able to connect to the LAN. Examples of such handshake are Wireless Equivalent Privacy (WEP) based shared key authentication, 802.1x based port access control, 802.11i based authentication etc. The AP can provide additional security measures such as encryption, firewall, and station MAC address based access control. Other techniques also exist to enhance security of the LAN over WiFi.

Despite these measures, many limitations still exist with WiFi. Hackers are increasingly exploiting these limitations as a way to attack the LANs of the organizations. As merely an example, as recently reported in the Wall Street Journal (see "Breaking The Code: How Credit-Card Data Went Out Wireless Door", The Wall Street Journal, May 4, 2007), wireless communications were used to steal 45.7 million credit and debit card numbers from the LAN of the TJX Cos. of Framingham, Mass. It is also reported that the TJX's breach-related bill could surpass $1 billion over five years. As another example, the organizations often fail security audits on grounds of wireless vulnerabilities. Many of these organizations are also required to be compliant with regulatory standards such as PCI-DSS (Payment Card Industry Data Security Standard), HIPAA (Healthcare Insurance Portability and Accountability Act) etc. Failure of security audits can attract monetary and statutory penalties.

Appropriate security mechanisms are thus needed to protect the LAN resources from wireless intruders. Accordingly, techniques for improving security for local area network environments are highly desirable.

SUMMARY OF THE INVENTION

The present invention relates generally to wireless computer networking techniques. More particularly, the invention provides a method and a system for providing wireless vulnerability management for local area computer networks. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", Bluetooth, and others.

One of the objects of the present invention is to provide wireless vulnerability management as Software-as-a-Service (SaaS). The invention provides for wireless vulnerability management for local area computer networks to be provided as a hosted service. The invention provides for customer entities subscribing for wireless vulnerability management service with a service provider entity. The service provider entity can host and operate a wireless vulnerability management server. The customer entities deploy sniffers supplied by the service provider entity on their premises. The sniffers monitor wireless activity and report the associated information to the server. Each of the customer entities can customize the processing of the information reported by its sniffers. The customers can pay for the wireless vulnerability management based upon their usage of various wireless vulnerability management features.

According to a specific embodiment, a Software as a Service (SaaS) based method is provided for providing wireless vulnerability management for local area computer networks. The method includes providing a security server. The security server can be hosted by a service provider entity. Moreover, the security server is coupled to the Internet and is adapted to provide analysis of data associated with wireless vulnerability management for a plurality of local area computer networks of a plurality of customer entities, respectively. For example, the customer entity can be retail organization, hospital, financial institution, educational institution, defense organization, federal institution, or any other organization which uses a local area network to conduct its business and desires to protect its local area network from wireless vulnerabilities. The local area network (e.g., private network) of the customer entity is coupled to the Internet through a customer side firewall. In an embodiment, the service provider entity can be a business entity separate from the customer entity. Examples of the service provider entity include among others managed service provider (MSP), application service provider (ASP), remote network management provider, auditor, penetration tester and like. The security server can be coupled to a local area network of the service provider entity. The local area network of the service provider entity can be coupled to the Internet through a service provider side firewall. In an embodiment, the security server can comprise one or more interconnected computers.

The method also includes creating a workspace for wireless vulnerability management for a customer entity on the security server. In an embodiment, the creating the workspace is responsive to a request from the customer entity to subscribe to wireless vulnerability management service. The method includes receiving configuration information associated with the workspace for the customer entity at the security server.

Moreover, the method includes supplying one or more sniffers to the customer entity. In an embodiment, at least one of the one or more sniffers is a sniffer device and the supplying the one or more sniffers includes shipping the sniffer device to the customer entity. In an alternative embodiment, at least one of the one or more sniffers is a software adapted to perform sniffer functionality. In this embodiment, the supplying the one or more sniffers includes making the sniffer software available to the customer entity for downloading (e.g., downloading over the Internet).

The method includes deploying the one or more sniffers at premises of the customer entity, and subsequently receiving connection requests at the security server over the Internet from the one or more sniffers. The method also includes associating identities of the one or more sniffers with the workspace for the customer entity at the security server. The one or more sniffers scan radio channels and collect information associated with wireless activity observed on those radio channels. The method includes receiving at the security server information associated with wireless activity monitored by the one or more sniffers at the premises of the customer entity. The information is received from the one or more sniffers over the Internet. Moreover, the method includes processing the received information associated with the wireless activity within the workspace for the customer entity using the security server and metering usage of the workspace for wireless vulnerability management for the customer entity. In an embodiment, a level of subscription (e.g., trial, paid, partially paid) etc. may be associated with the workspace. In an embodiment, the metering can include tracking or accounting the usage of the workspace. In an alternative embodiment, the metering can include charging the customer entity for the usage of the workspace. Yet alternatively, the metering can include charging the customer entity for the usage of the workspace based at least upon the tracked or accounted usage of the workspace.

In an embodiment of the present invention, wireless vulnerability management is provided for the plurality of local area computer networks of the plurality of customer entities, respectively, in a substantially concurrent manner.

According to an alternative specific embodiment, a server system comprising one or more interconnected computers is provided. The one or more interconnected computers are adapted to provide wireless vulnerability management based upon Software as a Service (SaaS) for a plurality of private computer networks of a plurality of customer entities, respectively. These computers are programmed to execute the step of receiving information associated with wireless activity from a plurality of sets of sniffers over the Internet. These plurality of sets of sniffers are positioned within premises of the plurality of customer entities, respectively, in a preferred embodiment. The computers are also programmed to execute the step of maintaining a plurality of workspaces for wireless vulnerability management for the plurality of customer entities, respectively. They are programmed to execute the step of identifying a plurality of portions of the received information that are associated with the plurality of customer entities, respectively. The computers are programmed to execute the step of processing the plurality of portions within the plurality of workspaces, respectively. They are also programmed to execute the steps of metering usages of the plurality of workspaces and generating billing data for the plurality of customer entities based at least upon the metering.

According to yet an alternative specific embodiment, a Software-as-a-Service (SaaS) based method is provided for availing wireless vulnerability management for local area computer network. The method includes generating a request for wireless vulnerability management for a local area network of a customer entity and receiving login information associated with a workspace for the customer entity. In this embodiment, the workspace is created on a security server to provide wireless vulnerability management for the local area network of the customer entity. Moreover, the security server can be hosted by a service provider entity. The security server is coupled to the Internet and is adapted to provide analysis of data associated with wireless vulnerability management for a plurality of local area computer networks of a plurality of customer entities, respectively.

The method includes providing configuration information associated with the workspace for the customer entity to the security server. The method also includes receiving one or more sniffers at premises of the first customer entity and connecting the one or more sniffers to the local area network of the first customer entity. Moreover, the method includes generating connection requests to the security server over the Internet from the one or more sniffers, respectively, subsequent to the one or more sniffers being connected to the local area network of the first customer entity. The method includes transferring identity information from the one or more sniffers to the security server. This identity information can be used to associate the one or more sniffers with the workspace for the first customer entity.

The method also includes sending to the security server information associated with wireless activity monitored by the one or more sniffers at the premises of the first customer entity. The information is sent from the one or more sniffers to the security server over the Internet. The method includes receiving results from processing of the sent information associated with the wireless activity. The processing is performed using the security server and is performed within the workspace for the customer entity. Depending upon embodiment, the results can include alerts (alarms), reports, displayed information etc. The method includes generating payment authorization based at least upon usage of the workspace for the customer entity.

According to a further alternative specific embodiment, a server computer adapted to provide wireless vulnerability management as Software-as-a-Service (SaaS) for a plurality of private computer networks of a plurality of customer entities, respectively, is provided. The server computer comprises a memory unit storing computer executable instructions and a processor unit for executing the computer executable instructions. Moreover, the server computer comprises a communication interface for coupling the server computer to a computer network. The computer executable instructions are adapted to perform the step of receiving information associated with wireless activity using the communication interface from a plurality of sets of sniffers over the Internet, the plurality of sets of sniffers being positioned within premises of the plurality of customer entities, respectively. The computer executable instructions are also adapted to perform the step of maintaining a plurality of workspaces for wireless vulnerability management within the memory unit for the plurality of customer entities, respectively. The instructions are adapted to perform the steps of identifying a plurality of portions of the received information that are associated with the plurality of customer entities, respectively, and processing the plurality of portions using the processor unit in accordance with the plurality of workspaces, respectively. The server computer is also provided with a power adapter for coupling the server computer to a source of power. Preferably, the processor unit, the memory unit, the communication interface, and the power adapter are provided within a single enclosure.

Various advantages and/or benefits may be achieved from various embodiments of the present invention. The present invention advantageously provides for the security server to be hosted by a service provider entity, which is separate from a customer entity which owns/operates/uses the LAN for which wireless vulnerability management is desirable. The security server can be often geographically remote to the customer premises. Advantageously, the present invention provides for the expensive security server resources to be shared across a plurality of customer entities. The method and system according to the present invention can reduce overhead of deployment and operation of the wireless vulnerability management system for the customer entities. By providing for subscription based model for wireless vulnerability management, entry cost is reduced for the customer entities. The techniques according to present invention can also facilitate for the customer entities starting small with wireless vulnerability management and then grow as the budgets become available. An embodiment of the present invention also facilitates the customer entities to customize their workspace per their security needs, compliance requirements, budgets etc. These features make wireless vulnerability management affordable and feasible for customer entities. This in turn can reduce occurrences of security breaches and audit failures for the customer entities. For example, the technique can prevent theft of credit card data, social security number data etc. from the LANs of the customer entities. In an embodiment, the system and the method according to the present invention can be implemented using "Web 2.0" framework, and thus provide benefits associated with the Web 2.0 framework.

These and various other objects, features and advantages of the present invention can be more fully appreciated with reference to the detailed description and accompanying drawings that follow.

BRIEF DESCRIPTION OF THE DRAWINGS

FIG. 3A illustrates an exemplary computer screenshot to facilitate inputting information associated with authorized wireless network according to an embodiment of the present invention.

FIG. 4B illustrates an exemplary computer screenshot to facilitate inputting information associated with notification preferences according to an embodiment of the present invention.

FIG. 4C illustrates an exemplary computer screenshot to facilitate inputting information associated with wireless vulnerability reports to be generated according to an embodiment of the present invention.

FIG. 4D illustrates another exemplary computer screenshot to facilitate inputting information associated with wireless vulnerability reports to be generated according to an embodiment of the present invention.

FIG. 5 illustrates an exemplary computer screenshot to display wireless activity information according to an embodiment of the present invention.

DESCRIPTION OF THE SPECIFIC EMBODIMENTS

Figure 1A:
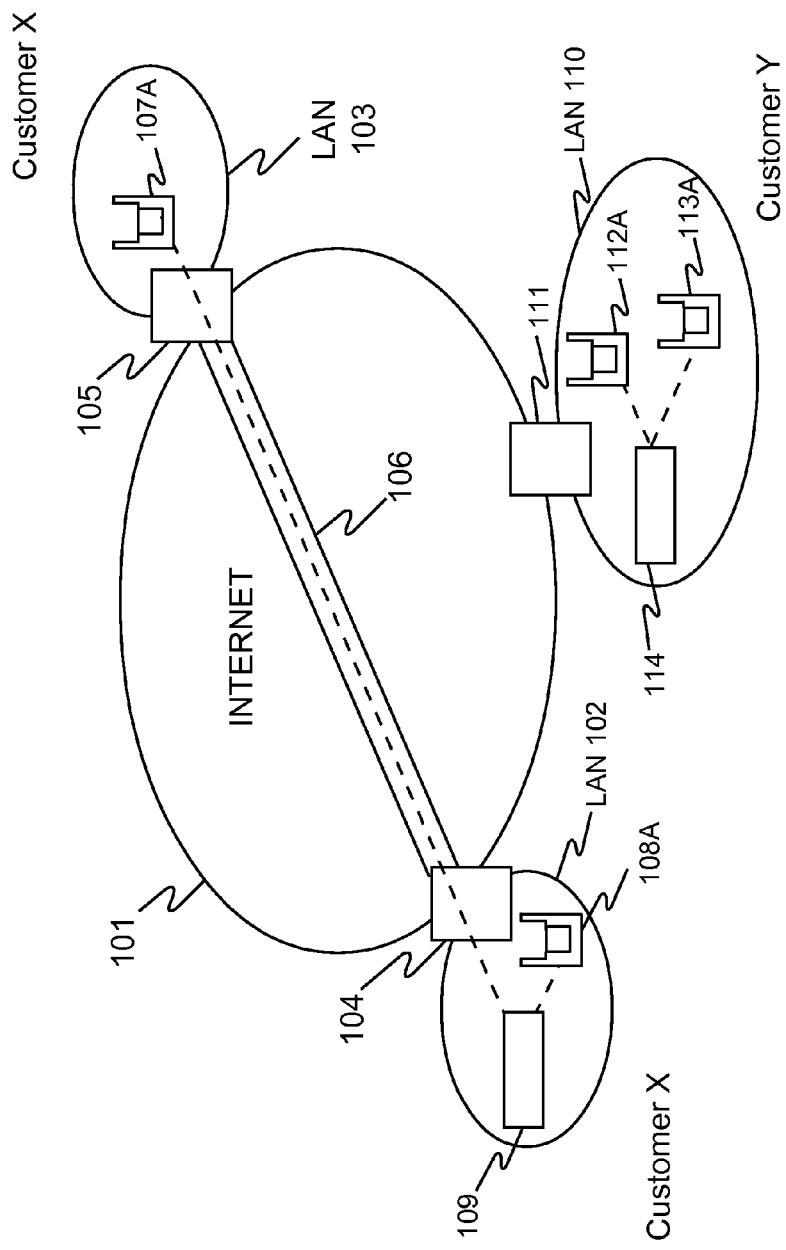
FIG. 1A illustrates an exemplary conventional WIDS/WIPS system configuration for wireless security for local area computer networks.

Wireless devices have become ubiquitous and easily available. As merely an example, these include wireless devices using IEEE 802.11 family of standards (commonly referred to as "WiFi"). The WiFi devices can include WiFi Access Points (APs) as well as client devices such as laptops with wireless connectivity, wireless handheld scanners, mobile phones etc. These devices have become all too commonplace—in and around homes, coffee shops, public and municipal areas, and business premises of typical organizations which often include private networks (e.g., local area networks (LANs)) of those organizations.

Hackers are increasingly using wireless communication as a way to attack the LANs of the organizations. As merely an example, as recently reported in the Wall Street Journal, wireless communications were used to steal 45.7 million credit and debit card numbers from the LAN of the TJX Cos. of Framingham, Mass. It is also reported that the TJX's breach-related bill could surpass $1 billion over five years.

Proliferation of wireless communication creates a variety of vulnerabilities for the LAN. Examples of these vulnerabilities include, but not limited to:

Unmanaged APs: Unmanaged AP can be an AP that is installed on the LAN of the organization by unassuming or malicious employee without the knowledge of the owner/administrator of the network. Such an AP may not employ the right security controls and can provide a way for hackers to access the LAN in an unauthorized manner.

Outdated Security Controls: Wireless devices that use outdated or weak security controls provide avenues for hackers to get into the LAN in an unauthorized manner. They can also enable hackers to eavesdrop on the wireless communication in the LAN. As merely an example, a wireless encryption technique called WEP (Wired Equivalent Privacy) is a weak form of encryption and it can be evaded by hackers using software tools that are openly available. Examples include aircrack, aircrack-ptw etc. Use of WEP for wireless communication in the LAN can provide a way for hackers to access the LAN in an unauthorized manner. For example, the hacker can recover the secret key used in WEP encryption using these and other hacking tools and use it to obtain access to the LAN. The hacker can also eavesdrop on wireless communication in the LAN using this key.

Unauthorized Wireless Connections: Stations with built-in wireless communications capability (e.g., laptops using Centrino technology from Intel Corporation of Santa Clara, Calif.) can engage in unauthorized wireless connections, either accidentally or maliciously. For example, the WiFi radios in the stations are often configured to connect to the AP with strongest signal strength. In a typical downtown environment for example, wireless signals from a fairly large number of APs in the vicinity (e.g., in neighbor's LANs, in municipal WiFi, in coffee shops etc.) can be detected by the station with built-in WiFi radio. It is likely that the signal strength from the neighboring AP is stronger than the signal strength from the authorized AP in the organization' LAN (e.g., if the station is near the boundary of the organization premises). The station can thus connect to these neighboring external APs. This creates security vulnerability.

Man-in-the-Middle Attacks: Certain connection behavior of WiFi stations can be exploited to lure them away from legitimate connections and into making connections with malicious APs. As merely an example, a honeypot AP can lure WiFi stations into connecting to it and then exploit the station via variety of attacks including Man-in-the-Middle attack. Hacking tools such as KARMA, delegated, Airsnarf are available to execute honeypot attack. The attacker AP can also use a MAC spoofing process to lure stations into connecting to it.

Ad-hoc Connections: The WiFi provides certain mode of communication in which stations can form wireless connections among themselves, e.g., without having to go through an AP. Such connections are undesirable as typically security controls on legitimate wireless communications are exercised by the AP. The ad-hoc connections can bypass these security controls exposing the stations and data therein to exploitation by hackers.

DOS (denial of service) Attacks: Attackers can disrupt operation of wireless network by transmitting certain wireless signals from vicinity of the wireless network. Moreover, attackers can use techniques such as high gain antennas and directional antennas to increase the range and/or potency of the transmitted attack signals. In certain DOS attacks, the attacker transmits certain specially crafted 802.11 frames (e.g., spoofed deauthentication frames, spoofed disassociation frames, frames with large values for NAV (network allocation vector) fields in them etc.) to disrupt the legitimate WiFi communication. The disruption of wireless network is undesirable, in particular, when the wireless network supports mission critical applications such as voice, telemetry, patient monitoring etc. Certain details about DOS attacks can be found in a paper by Bellardo and Savage, entitled "802.11 Denial of Service Attacks: Real Vulnerabilities and Practical Solutions", 12$^{th}$ USENIX Security Symposium, August 2003; which is hereby incorporated by reference herein.

The vulnerabilities described herein are for illustrative purposes only and do not limit the scope of the present invention. These and other vulnerabilities put the LANs at risk from attackers who use wireless communications as a way to get into the LAN and/or legitimate wireless devices associated with the LAN. As merely an example, a retailer organization's LAN can comprise of computers that store credit card information. Attacks launched using wireless communications can put the retailer at risk of credit card information theft. Moreover, the retailer may be required to comply with data security guidelines of the PCI-DSS and the wireless vulnerabilities may make the retailer's LAN non-compliant with the PCI-DSS.

As another example, a hospital LAN can comprise of computers that store patient health and insurance data. Attacks launched using wireless networks can put the hospital at risk of theft of private information about patients. The wireless vulnerabilities may in addition put the hospital at risk of violating HIPAA and thus attracting legal penalties.

As a further example, a bank's or financial institution's LAN can comprise of computers that store customers' financial information. Attacks launched using wireless networks can put the bank at risk of theft of private information of customers, modification of bank records, and can even put the bank at risk of security audit failure and legal penalties associated with it. Certain organizations are required to comply with regulatory requirements such as GLB (Gramm Leach Bliley) Act and SOX (Sarbanes Oxley) Act and wireless vulnerabilities can make them non-compliant with these regulatory requirements.

Thus there is a need for techniques that can address the issues described above and throughout the present specification arising out of wireless communications related vulnerabilities.

Conventionally, certain techniques are available for vulnerability scanning of LANs. In one technique, vulnerability scanning vendors can scan the LAN from the Internet to detect vulnerabilities in the LAN. For example, the organization's LAN is connected to the Internet using a gateway and/or a firewall. The gateway and/or the firewall typically has an IP address (e.g., public IP address) using which it connects to the Internet. For performing the vulnerability scanning, the IP address of the gateway is provided to the scanning vendor. The scanning vendor maintains an inventory of vulnerability scanning tools which are then launched targeted to the IP address provided above. That is, this technique can scan the public Internet facing interface of the LAN. Examples of the scanning tools in the inventory can include Nessus, GFI LANguard, Retina Network Security scanner, SAINT, nmap etc. Subsequent to the vulnerability scanning, a report containing results (e.g., any open ports detected, any private device in the LAN detected as accessible from the Internet, any misconfigurations on the firewall detected etc.) is provided to the customer (e.g., owner/operator of the LAN of the organization).

In certain another conventional technique for vulnerability scanning of LANs, the scanning vendors can install certain devices on the LAN. These devices can take form of a network appliance that can be plugged into the customer's LAN (e.g., using Ethernet connection). The network appliance can be configured to scan the LAN for operating system vulnerabilities (e.g., missing security patches), misconfigurations etc. on the PCs and servers connected to the LAN. The vulnerabilities detected can be presented in the form of report. The report may contain pointers to URLs on the Internet which provide further details about the detected vulnerabilities and remedies such as software upgrade.

In yet another conventional technique, radio channels are scanned in vicinity of the LAN using certain handheld tools. The handheld tool can take the form of a software running on a laptop or a PDA equipped with WiFi radio. The software can capture wireless traffic (e.g., 802.11 frames transmitted on various radio channels). It can present information about the captured traffic on a display screen, can store it in a file, and/or print it. The displayed information can include visible wireless devices (APs, clients etc.), their operating channels and security settings, radio signal strengths received from the wireless devices, connections among the wireless devices etc. Certain reports can be generated based on the information collected and/or displayed. This technique is also called as walk-around survey. For example, Laptop Analyzer and Handheld Analyzer provided by AirMagnet Inc. of Sunnyvale, Calif. can be used as handheld tools for walk-around surveys.

In another conventional technique, wireless sensor devices are provided spatially dispersed over a geographic region of operation of the LAN. The sensor devices are also coupled to the LAN (e.g., using Ethernet connections). The wireless sensor devices scan radio channels and gather information about wireless traffic detected on those channels. The gathered information is communicated to a server device that is also coupled to the LAN. The server can store and process the gathered information. A console can be provided for reviewing the results of the processing of the gathered information and for the user to interact with the system. The system of wireless sensors, the server, and the console is often called as Wireless Intrusion Detection System (WIDS) or a Wireless Intrusion Prevention System (WIPS). This system can detect wireless vulnerabilities, and optionally block wireless communication associated with the detected vulnerabilities. Example of WIDS/WIPS include SpectraGuard Enterprise provided by AirTight Networks of Mountain View, Calif.

Several limitations exist with the conventional techniques. For example, the vulnerability scanning of the public Internet facing interface of the LAN is insufficient to detect wireless vulnerabilities described above and throughout the present specification. The walk-around survey with the handheld scanner fails to monitor wireless vulnerabilities on a continuous basis. Moreover, with walk-around survey, it is extremely difficult to correlate information from different sites, store consolidated site-wide information at a central location etc. The WIDS or WIPS installed on a customer site and often managed by the customer turns out to be an expensive proposition from capital and operational expenses and deployment standpoint. Moreover skilled personnel are required to deploy and manage the WIDS/WIPS as well as monitor, analyze, and interpret information provided by the WIDS/WIPS about the LAN's wireless environment. Such personnel are hardly available with many customers. These limitations often leave LANs exposed to wireless vulnerabilities which often go undetected and can result in information security breaches over a period of time. The present invention provides techniques to overcome these and other limitations and to facilitate wireless vulnerability management for LANs.

The present invention provides a method and a system for wireless vulnerability management for local area computer networks. In an embodiment, the present invention provides for wireless scanning devices (hereinafter referred as "sniffers") to be deployed at customer premises. Advantageously, in one specific embodiment, the sniffers can be pre-configured for operation in the customer premises so that deployment overhead is reduced. The sniffers can scan radio channels and gather information about wireless traffic on those radio channels in a vicinity of the LAN. In this embodiment, the sniffers communicate information about the detected wireless traffic to the wireless vulnerability management server (hereinafter referred to as a "security server"). The security server can store and process the detected wireless traffic for vulnerability assessment. It can store results of the assessment, e.g., over a period of time. The security server can communicate the results to the user via alerts, reports and other types of output.

Figure 1B:
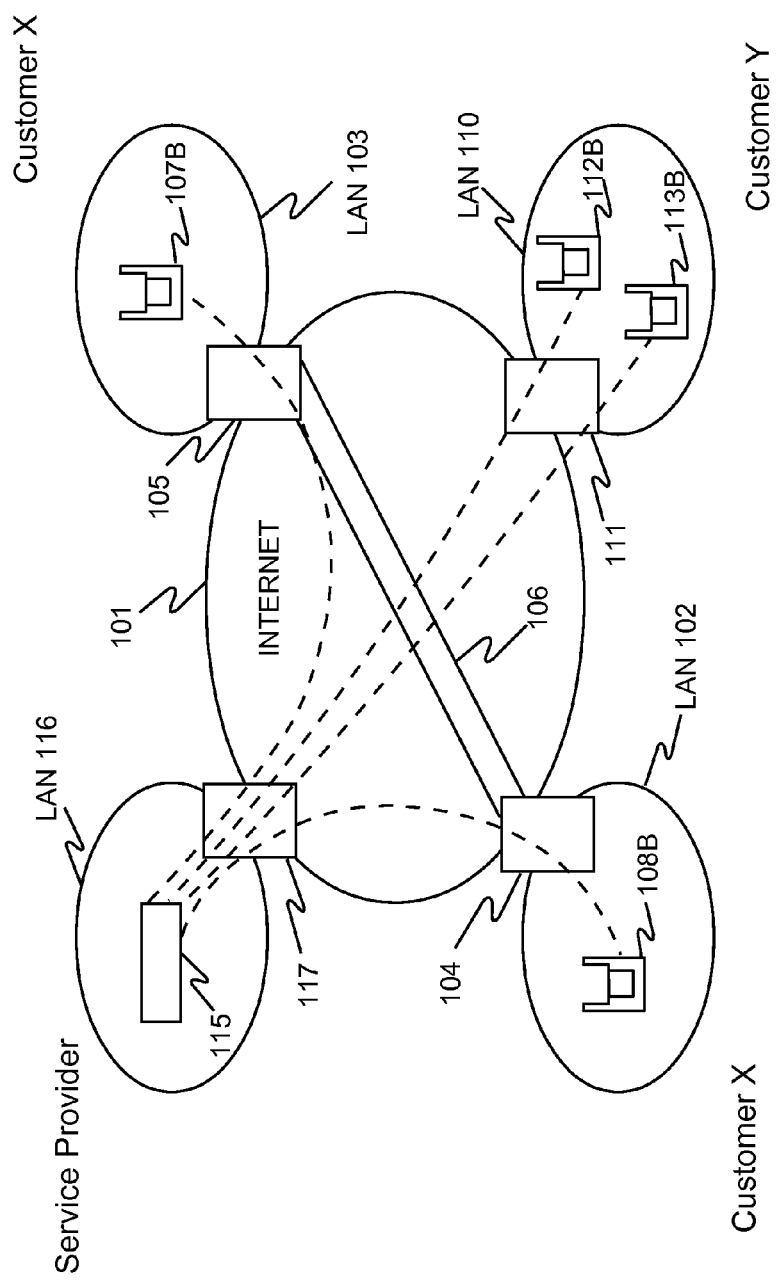
FIG. 1B illustrates an exemplary SaaS (Software-as-a-Service) system configuration for wireless vulnerability management for local area computer networks according to an embodiment of the present invention.

An exemplary conventional WIDS/WIPS system configuration 100 for providing wireless security for local area computer networks is illustrated in FIG. 1A, while an exemplary system configuration 110 for providing wireless vulnerability management as Software as a Service (SaaS) according to an embodiment of the present invention is illustrated in FIG. 1B. As shown in FIG. 1A, customer entity X has two LANs 102 and 103 at two geographic locations (e.g., offices in two cities) respectively. The LANs 102 and 103 are coupled to the Internet 101 through firewalls 104 and 105, respectively. The LANs 102 and 103 are interconnected using a VPN (Virtual Private Network) tunnel 106 over the Internet. The LANs 102 and 103 and the VPN tunnel 106 thus form a private network of the customer X. Also shown are wireless sensors 107A and 108A deployed within the premises of customer X to monitor wireless activity therein. The sensors send information associated with their monitored wireless activity to a server 109 of customer X for processing, storage etc. That is, the server 109 is connected to the private network of customer X. The transfer of information from the sensors to the server is illustrated via dashed lines in FIG. 1A. Similarly customer Y has LAN 110 that is coupled to the Internet through the firewall 111. The sensors 112A and 113A of the customer Y send information associated with their monitored wireless activity to the server 114 for processing, storage etc. That is, the server 114 is coupled to the private network of the customer Y.

As shown in the SaaS configuration of FIG. 1B, the security server 115 is provided in the service provider LAN 116. The security server is operated and maintained by the service provider. The operating/maintaining the security sever can include upgrading the security server (e.g., software on the server) to facilitate newer wireless vulnerability management techniques, performing database backups and so on. The service provider LAN 116 is coupled to the Internet 101 through the firewall 117. The sniffers 107B and 108B at customer X premises and the sniffers 112B and 113B at customer Y premises send information about monitored wireless activity to the security server 115 over the Internet. The transfer of information from the sniffers to the server is illustrated via dashed lines in FIG. 1B. The security server 115 processes and stores data reported by sniffers at customer premises X separate from that reported by sniffers at customer premises Y. For example, X and Y can have separate configurations for wireless vulnerability management operation, can represent diverse types of organizations (e.g., X can be a retailer and Y can be a Hospital, X can be a high school and Y can be a financial institution etc.) and thus have diverse security requirements, budgets, could have subscribed to different sets of modules for wireless vulnerability assessment and so on.

In various embodiments of the present invention, the sniffers 107B, 108B, 112B, and 113B etc. can use variety of protocols to send information about monitored wireless activity to the security server over the Internet. In an embodiment, at least a portion of the information can be sent using TCP (Transmission Control Protocol). In an alternative embodiment, at least a portion of the information can be sent using UDP (User Datagram Protocol). In yet an alternative embodiment, the information sent over the Internet can be encrypted and/or authenticated. As merely an example, protocols such as IPSec (IP Security), HTTPS (Hyper Text Transfer Protocol Secure) etc. can be used to encrypt the information sent over the Internet. In another embodiment, one or more VPN tunnels can be formed over the Internet between the LANs of the customers and the service provider LAN. At least a portion of the information can be sent through the VPN tunnels. In yet another embodiment, the sniffers positioned at the customer premises send at least a portion of the information about monitored wireless activity to one or more computers in the customer network (e.g., customer's LAN, customer's private network etc.) and these one or more computers can in turn send the information to the security server over the Internet. These embodiments are exemplary only and various other alternatives will be apparent to persons with ordinary skill in the art based upon the present specification.

The present invention advantageously provides for the security server to be hosted by a service provider entity, which is separate from a customer entity which owns/operates/uses the LAN, and often geographically remote to the customer premises. Advantageously, the present invention provides for the expensive security server resources to be shared across a plurality of customer entities.

Moreover, the present invention provides a workspace for the customer on the security server and facilitates the customer to select and/or configure the wireless vulnerability management workspace as per needs and budget. In an embodiment, the customer can also optionally avail services from skilled professionals at the service provider entity to configure and operate the wireless vulnerability management workspace on the customer's behalf. By reducing the overhead of deployment, the entry cost, and the expenses and the required skills for operation, the present invention provides for affordable wireless vulnerability management.

Figure 2:
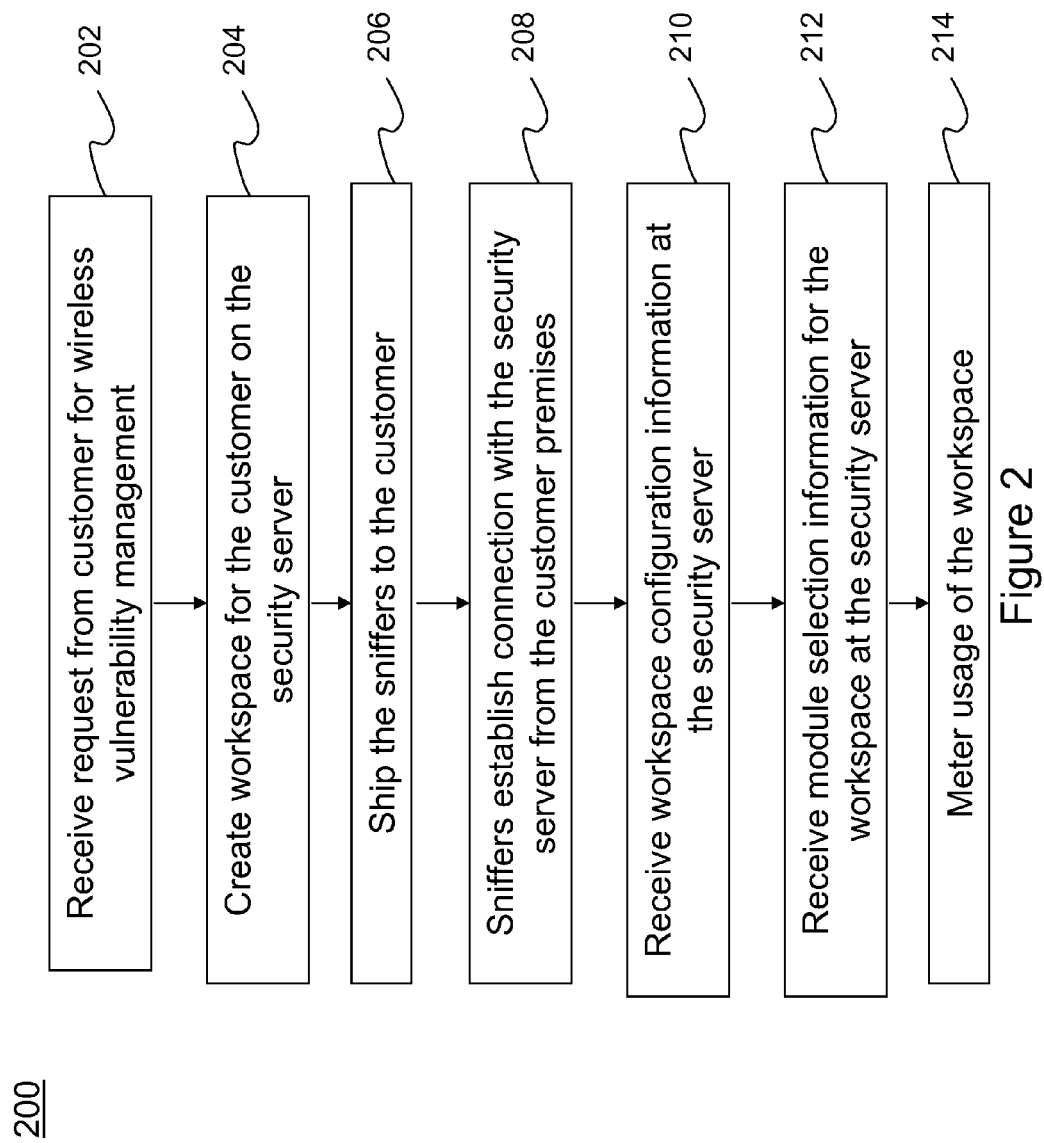
FIG. 2 illustrates an exemplary logical flow of steps in a method for wireless vulnerability management for local area computer networks according to an embodiment of the present invention.

In an embodiment, the present invention provides a method for wireless vulnerability management. As merely an example, the system illustrated in FIG. 1B can provide an environment within which the method can be practiced. An exemplary logical flow of steps in the method 200 for wireless vulnerability management for local area computer networks according to an embodiment of the present invention is illustrated in FIG. 2 and described in more detail below. This diagram is merely an example and should not unduly limit the scope of the claims herein. One of ordinary skill in the art would recognize many variations, modifications, and alternatives based on the teachings of the present specification. In various embodiments, one or more steps can be omitted, one or more steps can be added, one or more steps can be modified, one or more steps can be split into sub-steps, one or more steps can be combined into lesser number of steps and like.

As shown in FIG. 2, at step 202 the method includes receiving a request for wireless vulnerability management from a customer entity. For example, the customer entity (e.g., owner/operator/user of a LAN) can request wireless vulnerability management for his or her LAN. As merely an example, the customer can log into a website adapted to receive requests for wireless vulnerability management from customers. Alternatively, other means of receiving requests such as email, phone call etc. can be used to receive the request for wireless vulnerability management. The request can include information such as customer's contact details. Moreover the request can include information such as total area of customer premises for which wireless vulnerability management is required, how the total area is distributed (e.g., among different geographic regions, floors etc.), and other type spatial layout information. Other types of information such as nature of business (e.g., retail, hospital, financial etc.) of customer and requirement for compliance with any security standard (e.g., PCI-DSS, HIPAA etc.) can also be included in the request. The request may indicate if the customer LAN includes or plans to includes an authorized wireless network of its own and if so information regarding device vendors, protocols (e.g., 802.11b/g, 802.11a), authentication and encryption schemes (e.g., WEP, WPA, 802.11i etc.) etc. associated with the authorized wireless network. In an embodiment, the request can also indicate that the customer does not have authorized wireless network of its own. Additional information such as volume of wireless traffic that is typically present in a vicinity of the customer premises, any previous security breaches the customer has experienced, requirement for abiding with various industry standards (e.g., Plenum rated sniffers, NEMA enclosures for outdoor deployment) etc. can also be included in the request. In an alternative embodiment, upon receiving request from the customer for wireless vulnerability management, a customer service associate can establish contact with the customer for receiving various types of information such as examples given before and like.

Step 204 includes creating a workspace for the customer on the security server. Advantageously in this embodiment, the security server can be hosted at a datacenter outside of the customer premises, at the service provider premises and like. Moreover, the security server can be shared across a plurality of customers. The customer can access the workspace over the Internet. In an embodiment, a customer account, e.g., having associated with it a username and a password, is associated with the workspace. Moreover, associated with the customer account can be identification of personnel and/or computer entities at the customer premises that are allowed to access the account and associated privileges. Examples of privileges can include among others privilege to view one or more screens (e.g., screens comprising information about visible devices, events, alarms, reports, configuration details etc. that pertain to the customer account), privilege to modify one or more operational configuration parameters, privilege to select/deselect one or more modules associated with wireless vulnerability management, privilege to initiate one or more remediation processes etc. Privilege can also depend upon the location where the wireless activity is detected. For example, certain operator may be allowed to view one or more screens associated with wireless activity information pertaining to one location that is under the purview of the operator, but not pertaining to another location which is not under the purview of the operator.

Step 206 can then prepare/configure the sniffers for the customer account and ship them to the customer entity via US postal services or courier services such as Fedex. In an embodiment, the sniffers are configured so that when they are deployed on the customer premises (as in step 208), they are able to discover (e.g., automatically) the security server and connect to it over the Internet. In an embodiment, a URL (Uniform Resource Locator) of the security server is configured in the sniffers. When the sniffers are connected to the LAN at the customer premises, they seek connection to the security server identified by the URL.

Alternatively or in addition, in this embodiment, the sniffers are configured so that when the customer deploys them on the premises (step 208) and when they connect to the security server from the customer premises (e.g., over the Internet) they appear within the customer's workspace created in step 204. In an embodiment, sniffer identities are associated with the customer account prior to shipping the sniffers to the customer. This enables associating the sniffers to the correct customer workspace when they connect to the security server from the customer premises. In an alternative embodiment, distinct authentication credentials (e.g., certificate, password etc.) are generated for sniffer groups belonging to distinct customer entities. The sniffers are required to present these authentication credentials for connecting to and/or interacting with the security server over the Internet. The use of the right credentials facilitate associating the sniffers to their correct customer workspaces in this embodiment.

In an alternative embodiment, step 206 can instead or in addition include making sniffer software available to the customer for download. The sniffer software is adapted to execute on one or more computers including radio communication facility at customer premises (e.g., laptops using Microsoft Windows family of operating system and Intel Centrino WiFi radio, PCs using Linux operating system and PCMCIA radio card, handheld devices such as PDAs, iPhone with built in or attachable WiFi radio card etc.). The software can include configuration information such as URL so that it can communicate with the security server after it is installed and run at the customer premises. Alternatively, it can prompt the user to input the security server identity information such as URL, IP address and like.

At step 208 in the method 200, the sniffers are deployed at the customer premises. In an embodiment, sniffers are spatially distributed over the customer premises to monitor wireless communications. The sniffers are also connected to the LAN using their wired or wireless network interfaces. The sniffers can access the Internet and communicate to the security server over the Internet. Preferably, the firewall that monitors traffic flowing across the LAN-Internet boundary should be configured to permit communication between the sniffers and the security server. As described in step 206, in an embodiment, when the sniffers connect to the security server, they are shown as active within the customer workspace on the security server.

At step 210, the customer can log into the customer workspace and provide information associated with his authorized wireless network. For example, the customer can log into the security server from a computer over the Internet. As merely an example, the customer can use a web browser such as Internet Explorer (provided by Microsoft Corporation of Redmond, Wash.), Netscape, Firefox provided by Mozilla Corporation of Mountain View, Calif. etc. to access the security server. The security server can be identified via a URL, an IP address etc. The security server may prompt the user for username and password. After successful login, the security server may send information across the Internet which is adapted to display certain screens in the web browser or various other types of user interfaces. These screens can be used by the customer to provide the authorized wireless network information.

The information associated with the authorized wireless network provided by the customer can advantageously facilitate detecting authorized and unauthorized wireless activity. It can also help detect certain wireless vulnerabilities. As merely an example, certain network name called as SSID (Service Set Identifier) is used to identify a WiFi wireless network. In an embodiment, the information associated with the authorized wireless network can include a list of SSIDs that are used in the authorized wireless network. In this embodiment, when the sniffer detects an AP that is using SSID outside this list, it can identify the AP to be unauthorized AP. Depending upon the embodiment, the information about the authorized wireless network can include identities of authorized access points (e.g., their wireless MAC addresses), security controls to be used for authorized wireless communication (e.g., WEP, WPA2, IEEE 802.11i, IEEE 802.11w etc.), identities of authorized wireless stations, identities of network segments (e.g., subnetworks, VLANs etc.) to which the APs are connected for traffic forwarding between wired and wireless media and like.

Figure 3B:
FIG. 3B illustrates another exemplary computer screenshot to facilitate inputting information associated with authorized wireless network according to an embodiment of the present invention.

Exemplary computer screenshots 300 and 320 that can facilitate the customer to input information associated with authorized wireless network are illustrated in FIGS. 3A and 3B, respectively. These diagrams are merely examples and should not unduly limit the scope of the claims herein. The information inputted by the customer can be received by the security server over the Internet (e.g., using protocols such as TCP, HTTP, HTTPS and like). As shown in FIG. 3A, the screen 300 can provide for selecting whether or not authorized WiFi network is present at a particular location in customer premises (301 and 302). If the authorized WiFi is present, the screen can provide for inputting SSID of the authorized WiFi network (303). One or more SSIDs can be inputted. In this embodiment, the screen 320 provides for inputting information associated with settings of APs associated with the authorized SSID, such as for example whether the SSID is for guest connectivity (304) which can then be treated differently from other SSIDs which are for authorized access for users within the organization, wireless security settings protocol (305), wireless authentication framework (306), wireless encryption protocol (307), 802.11 physical layer protocol (308), additional AP capabilities (309), authentication types (310), the networks to which the AP is allowed to connect wireless traffic to (311), vendor information (312) etc.

Figure 4A:
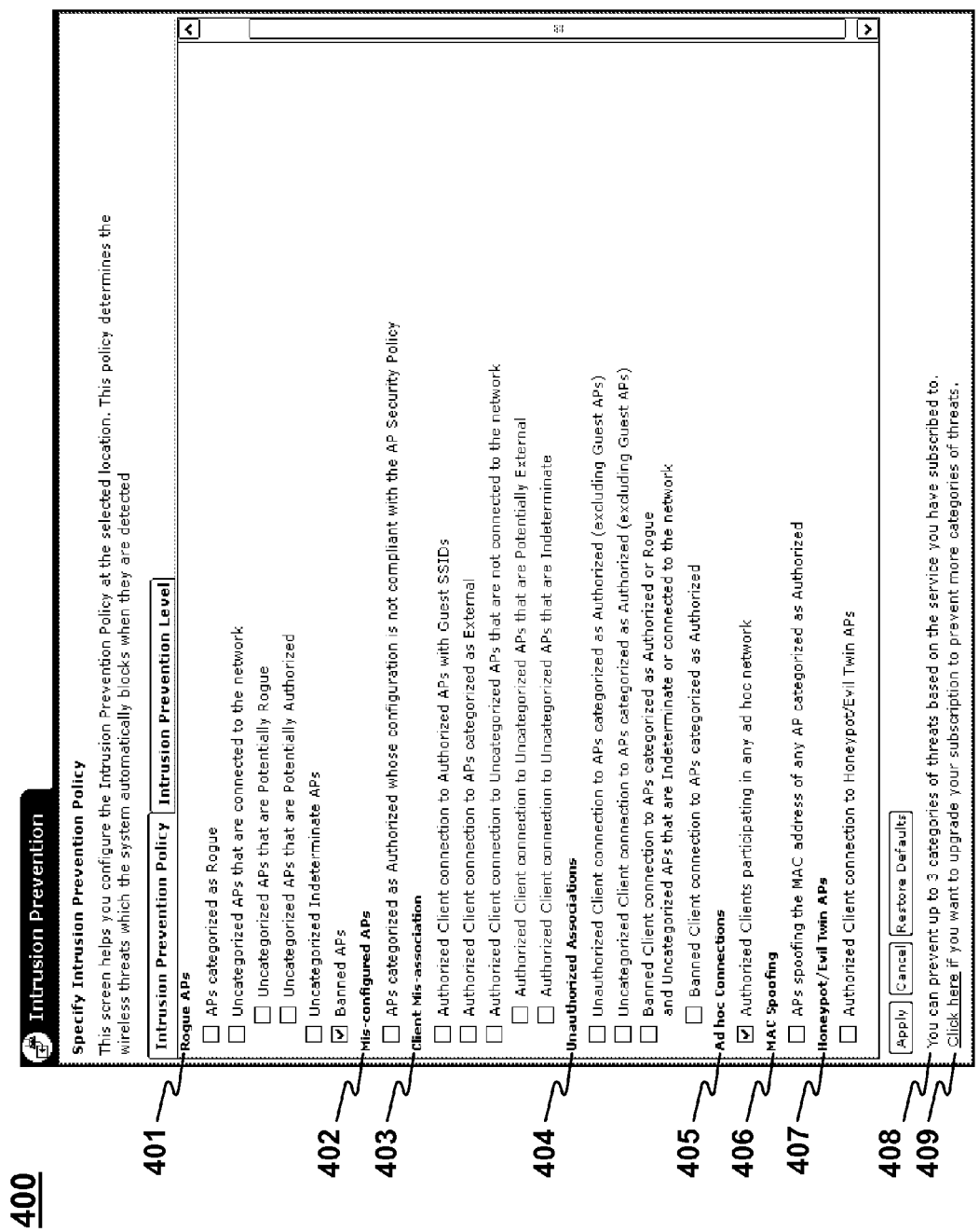
FIG. 4A illustrates an exemplary computer screenshot to facilitate inputting information associated with intrusion prevention configuration according to an embodiment of the present invention.

In an embodiment, step 210 can also include receiving information associated with certain operational configuration parameters. As merely an example, the operational configuration parameters can include configuration of certain actions to be performed responsive to certain unauthorized wireless activity (referred herein as "intrusion prevention"). An exemplary computer screenshot 400 that can facilitate inputting the intrusion prevention configuration is illustrated in FIG. 4A. This diagram is merely an example and should not unduly limit the scope of the invention. Persons of ordinary skill in the art can identify various modifications and alternative based on the present disclosure. The information inputted using the screen 400 can be received by the security server. As shown, the screen 400 can provide for selecting prevention (e.g., automatic prevention subsequent to detection) of various categories of wireless vulnerabilities (as shown by selections 401 to 407). In an embodiment, the screen also indicates the limit on the categories that can be selected (408). For example, this limit can be based upon the level of vulnerability management service (for example, subscription package) that the customer has subscribed to and agreed to pay for. The screen also provides for upgrading the service level to be able to select more categories (409).

In an alternative embodiment, the configuration information can include information associated with notification preferences, for example, manner of receiving notifications upon detection of a selected vulnerability. An exemplary computer screenshot 420 for inputting information associated with notification preferences is illustrated in FIG. 4B. This diagram is merely an example and should not unduly limit the scope of the invention. Persons of ordinary skill in the art can identify various modifications and alternative based on the present disclosure. As shown in FIG. 4B, the screen 420 can show a listing of vulnerabilities. For one or more of the listed vulnerabilities, a selection can be inputted/modified as to whether the notification is to be displayed (422), e.g., when the customer logs into the workspace and chooses to view the notifications, to be emailed (424), documented in report (426) etc. Severity level can also be assigned (or modified from default value) for the listed vulnerability (428). As shown at 432, the screen can provide information associated with cost of notification. In an embodiment, customer can be charged based upon the number of subscribed notifications (430). In an alternative embodiment, the customer can be charged based upon the number of notified vulnerabilities. In an embodiment, the cost of notification can also depend upon the severity level selected, the nature of vulnerability and so on.

In yet an alternative embodiment, the configuration information can include information associated with reports to be generated based upon the processing of the wireless activity information. Some exemplary computer screenshots 440 and 460 for inputting information associated with reports to be generated upon processing the wireless activity information are illustrated in FIGS. 4C and 4D, respectively. These diagrams are merely examples and should not unduly limit the scope of the claims herein. Persons of ordinary skill in the art would identify various modifications and alternative based on the present disclosure. As shown in FIG. 4C, the screen 440 can facilitate report configuration. For example, name of report (442), description of report (444) etc. can be configured (inputted). A delivery schedule (446) can also be configured (created) (448). Moreover, new reports can be configured (454A), existing reports can be reconfigured (454B), existing reports can be deleted (454C) etc. In this embodiment, one or more sections to be contained in the report (450) can also be configured using the various options such as adding (452A), editing (452B), and deleting (452C) sections. As shown in FIG. 4D, the nature of information to be filled into various sections can also be configured. As shown in screen 460, the logic (464) for filling information into a selected section (462) can be configured.

Figure 4E:
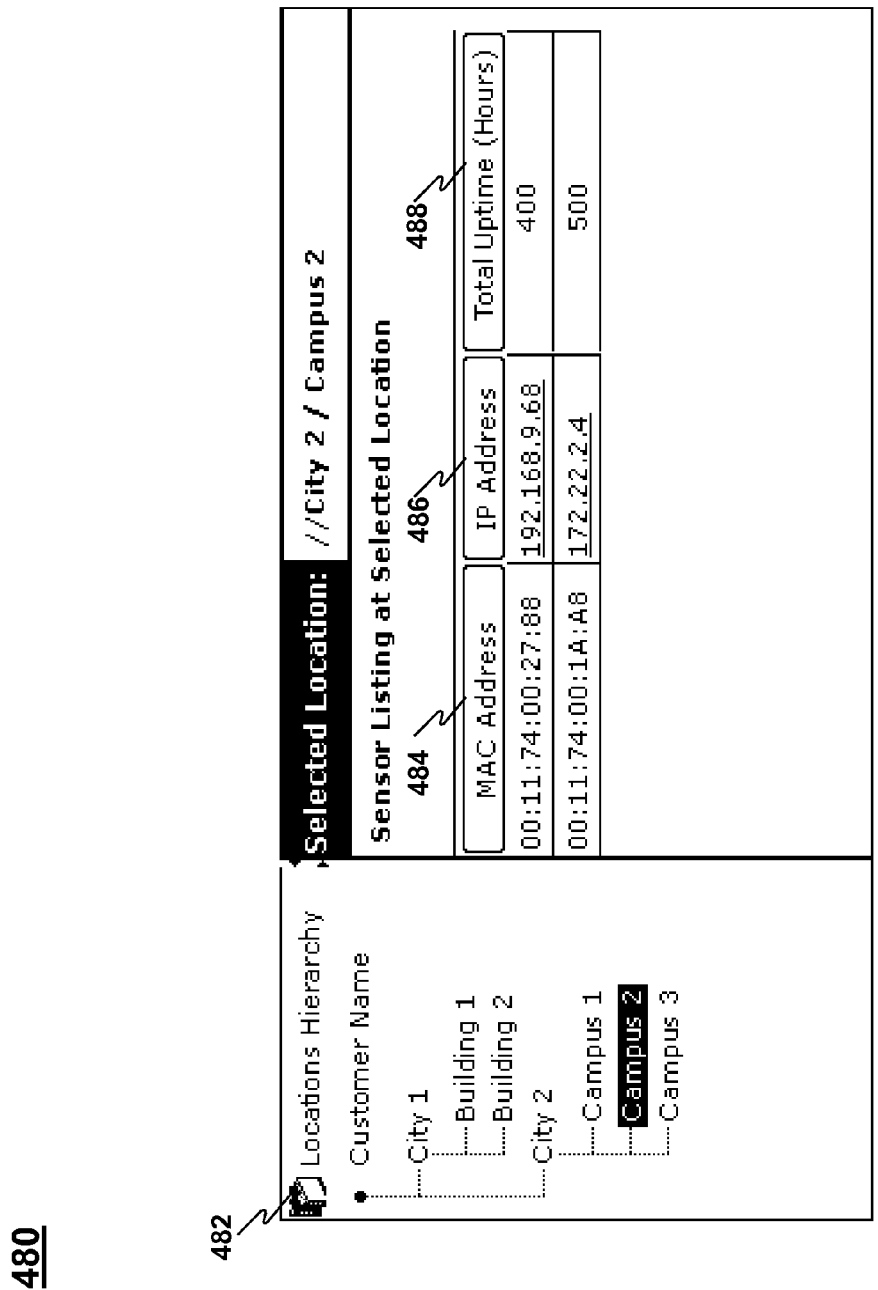
FIG. 4E illustrates an exemplary computer screenshot to facilitate inputting physical location information associated with customer site according to an embodiment of the present invention.

In yet a further alternative embodiment, the configuration information can include information associated with physical locations, e.g., hierarchy of physical locations at customer premises. The information can also include information about association between sniffers and the physical locations, for example, identifying for each sniffer a physical location where it is placed. This facilitates organization and processing of wireless activity information with regard to location where it is detected. An exemplary computer screenshot 480 for information associated with physical location hierarchy is illustrated in FIG. 4E. This diagram is merely an example and should not unduly limit the scope of the invention. Persons of ordinary skill in the art can identify various modifications and alternative based on the present disclosure. As shown in FIG. 4E, the screen 480 can indicate location hierarchy 482. In an embodiment, the customer entity can create the location hierarchy by inputting appropriate configuration information related to how the customer premises are laid out. In an embodiment, the sniffer identities can be associated with locations. As shown in the screen 480, the identities of sniffers (MAC addresses 484, IP addresses 486 etc.) associated with a selected location can be displayed. Preferably, the sniffers are positioned in customer premises at the associated locations. In an embodiment, the customer can associate sniffer identities to specific locations based upon how the sniffers are positioned in the customer premises. The uptime of sniffers can also be indicated (488). In an embodiment, the uptime information can be used to charge for sniffer usage (e.g., meter the sniffer usage for wireless activity monitoring). In various embodiments, certain other configuration and module selection information can also be specific to selected locations.

While certain exemplary configuration parameters have been described within the specific embodiments, they are not limiting and there are many others which persons of ordinary skill in the art can contemplate based on the present teachings.

At step 212, the customer can select from a plurality of modules for wireless vulnerability management. By way of examples, the plurality of modules include:

Scanning Module: In an embodiment, when the scanning module is selected (e.g., activated) the sniffers scan radio channels and report certain information about observed wireless activity to the security server. The security server can then display this information (e.g., when the customer logs into the security server over the Internet using a web browser or other means and chooses to review the information), send a report on the collected information (e.g., as a file download, via email) etc. An exemplary screenshot 500 for display of the wireless activity information gathered from the scanning is illustrated in FIG. 5. This diagram is merely an example and should not unduly limit the scope of the claims. Persons of ordinary skill in the art would recognize many alternatives and modifications based upon the present disclosure. As shown in FIG. 5, the screen 500 can provide for selecting whether the customer wants to view APs, clients, or connections (e.g., wireless connections among APs and clients) associated with the wireless activity (502). The location that is relevant for the wireless activity being displayed can also be indicated in the screen 500 (504). The screenshot 500 in FIG. 5 shows selection being made to view AP information. The identities of APs can then be displayed (506) along with various other detected information such as whether the AP is currently active (507), security settings on the AP (508), SSID (509), channel of operation (510), protocol (511), time since AP is up (512) and like. The screenshot 500 is exemplary only and should not limit the scope of the claims.

Various alternatives and modifications for displaying wireless activity information are possible and will be apparent to persons with ordinary skill in the art from the present disclosure. For example, in an embodiment, the display of wireless activity information can include signal strength information associated with the wireless activity. In an alternative embodiment, the display can include listing of packets (e.g., 802.11 MAC frames) detected by sniffers on the radio channels. Various constituent fields/parameters associated with one or more of the listed packets can also be displayed in an embodiment. In other alternative embodiments, the wireless activity information can include various statistics about packet transmissions, retransmissions, packet errors, transmission speeds, traffic on various radio channels, data/management/control traffic mix, unicast/broadcast traffic mix, voice/data traffic mix, channel noise, channel interference, device mobility patterns, traffic from/to various devices and so on.

Threat Assessment Module: In an embodiment, selecting the threat assessment module facilitates performing a variety of analyses on the wireless activity information collected by the sniffers. The results of these analyses can be provided to the customer (e.g., displayed, reported via email etc.). Threat assessment module can analyze the wireless activity information to detect variety of security threats. These include among others: unmanaged APs connected to the LAN, MAC spoofing, DOS attacks, WEP cracking, undesirable wireless connections, misconfigurations of authorized wireless network etc. Depending upon embodiments, one or more of these and other vulnerabilities/threats can be analyzed/detected. In an embodiment, a list of vulnerabilities/threats that can be analyzed/detected is presented to the customer and the customer can select (e.g., subscribe to) a subset or all of them.

Remediation Module: In an embodiment, when the remediation module is selected, it can take certain actions against the vulnerability/security breach detected. As merely an example, the remediation action can include blocking/disrupting communication over undesirable wireless connections. For example, suppose an unauthorized AP is detected to be connected to the LAN, the security server can take action to disable wireless communication associated with the unauthorized AP to prevent security breaches using such communication. In an embodiment, the security server can instruct the sniffer (e.g., one in a vicinity of the unauthorized AP) to disrupt any wireless communication associated with the unauthorized AP via a "deauthentication" procedure. In certain deauthentication procedure, the sniffer can send spoofed deauthentication messages to the AP and/or one or more clients connected to the AP instructing to disconnect the wireless link. Other types of remediation processes are possible.

In an embodiment, the prevention process is automatically initiated upon detection of security vulnerability. Alternatively, the prevention process for the detected vulnerability can be manually initiated when requested by the operator who attends to the detected vulnerability. The selection with regards to automatic or manual initiation of prevention processes for the one or more detected vulnerabilities can be provided as operation configuration parameters (e.g., as in step 210).

Location Tracking Module: In an embodiment, selecting the location tracking module facilitates determining (e.g., estimating) physical location of a source of threat posing wireless activity. This module can be useful for deployments which are spread over large geographic areas (e.g., millions of square feet). In an embodiment, location tracking is performed by triangulating the location of source of wireless activity based upon the receive signal strength measurements performed by the sniffers in a vicinity of the source. Depending upon embodiments, various types of location tracking can be provided such as coarse location tracking (e.g., site level, building level etc.), granular location tracking (e.g., cube level, room level etc.), on demand location tracking (e.g., when customer requests the location to be tracked), continuation location tracking (e.g., to trace the path of wireless device over a period of time and at certain intervals during that period) etc.

Reporting Module: In an embodiment, information related to the detected vulnerabilities/threats can be reported to the customer using reporting means such as email, SMS etc. Alternatively, the information can be reported using formats such as SNMP traps. In an embodiment, the detected vulnerabilities/threats are documented in a report and the report is made available to the customer at predetermined intervals (e.g., intervals selected by the customer) via means such as email, file download and like. In an embodiment, the reports can be pre-configured (e.g., PCI-DSS compliance assessment report, HIPAA compliance assessment report etc.). Alternatively or in addition, the customer can customize his own reports to document information required by customer's policy.

RF Visualization Module: The RF visualization module facilitates determining and providing visual displays of radio coverage of wireless network components (APs, sniffers etc.) based upon their placement information and information associated with spatial layout of the premises where they are/are to be positioned. Moreover, information about factors such as transmit power, receive sensitivity, antenna characteristics etc. can also be used in determining radio coverage. Determining and visualizing radio coverage can provide for various what-if analyses. As merely an example, visualizing the radio coverage of the sniffers can further facilitate determining threat detection coverage, remediation coverage, location tracking coverage and like. For example, for the sniffer to be able to detect certain wireless activity, it is necessary that the sniffer receives the wireless activity with certain minimum signal strength or with certain minimum packet error probability. As another example, for the sniffer to be able to remediate (e.g., prevent) undesirable wireless activity associated with a target device, it is necessary that the radio signals transmitted by the sniffer reach the target device with certain different minimum signal strength. As yet another example, to be able to perform location tracking for a device within a selected region via triangulation, it may be necessary that the signal transmissions from the selected region are detected by at least a certain minimum number (e.g., 3) of sniffers. As yet a further example, redundant coverage of more than one sniffers may be required for a selected region for fault tolerance. Depending upon the embodiments, one or more of these objectives are desirable. The RF visualization module can facilitate determining the sniffer placement to achieve the desirable objectives.

Figure 13A:
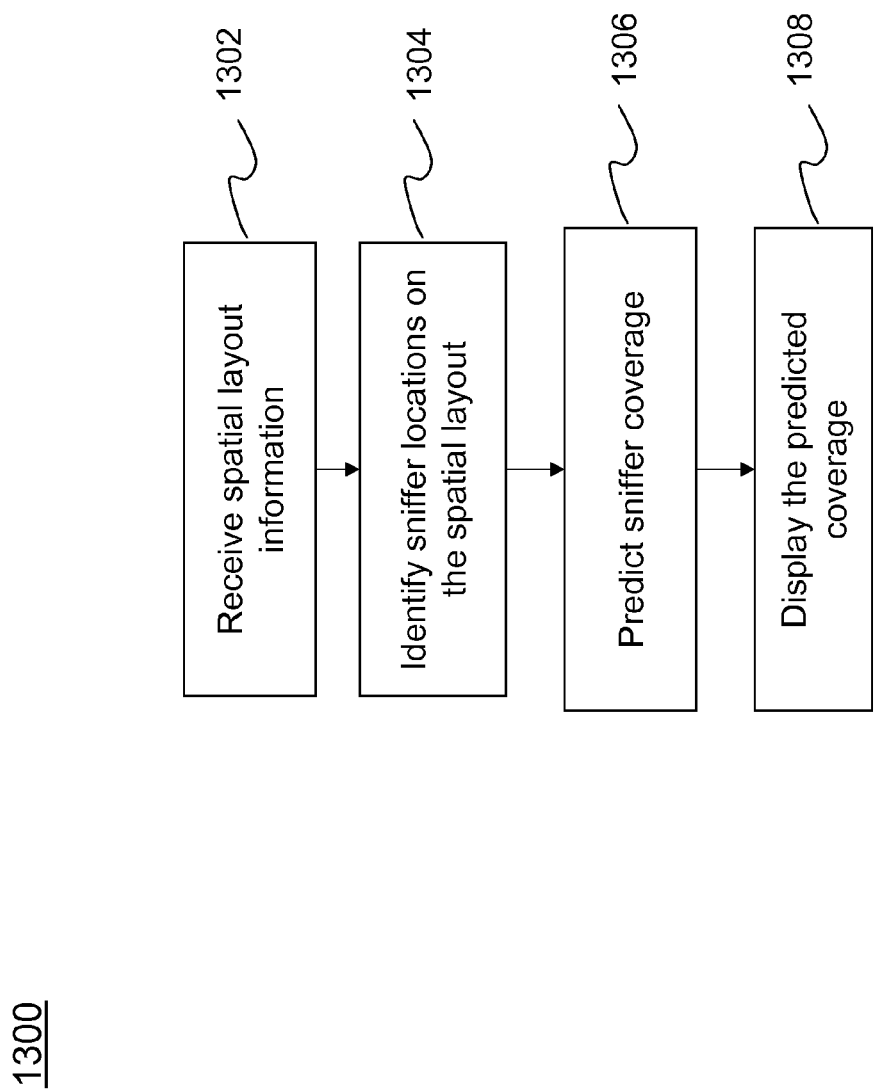
FIG. 13A illustrates an exemplary logical flow of steps in a method for RF visualization for sniffer coverage according to an embodiment of the present invention.

A logical flow of steps in a method 1300 for using RF visualization module according to an embodiment of the present invention is illustrated in FIG. 13A. This diagram is merely an example which should not limit the scope of the claims herein. One of ordinary skill in the art can contemplate many alternatives, variations and modifications to the method based upon the teachings of the present specification.

As shown in FIG. 13A, step 1302 can receive information associated with spatial layout of the customer premises where sniffers are or will be deployed. This information is used to generate a computer model of the premises. The computer model can include information associated with the layout components (e.g., physical dimensions, material type, location etc.) of the premises. The layout components can include, but not limited to, rooms, walls, partitions, doors, windows, corridors, furniture, elevator shaft, patio, floor, parking lot and foliage. In a specific embodiment, the information associated with the spatial layout can be received in the form of a layout drawing file prepared by CAD (computer aided design) software such as for example AutoCAD provided by Autodesk, Inc. of San Rafael, Calif. In an alternative embodiment, an image file of the layout of the premises is imported as a *.gif, *.jpg or any other format file to generate the computer model. In a specific embodiment, the image file depicts (encodes) a floor plan or a map of the premises. In an alternative specific embodiment, the image file can be a photograph or a scanning of the architectural drawing of the floor plan. In an embodiment, the image file can be annotated with details such as physical dimensions and material types of layout components.

Step 1304 of the method 1300 can facilitate positioning sniffer icons in the spatial layout of the premises. For example, the spatial layout map can be displayed on the computer screen and sniffer icons can be positioned on the displayed layout map. At step 1306, the method can predict the radio coverage of the sniffers and determine coverage for detection, remediation, location tracking, redundancy etc. based upon the computer model of the premises, the information associated with the sniffer placement and one or more radio signal propagation models. Step 1308 can display the predicated coverage areas in relation to the layout of the premises as exemplified by a computer screenshot 1310 of FIG. 13B. This diagram is merely an example which should not unduly limit the scope of the claims herein. One of ordinary skill in the can contemplate various alternatives and modifications based upon the teachings of the present specification.

Figure 13B:
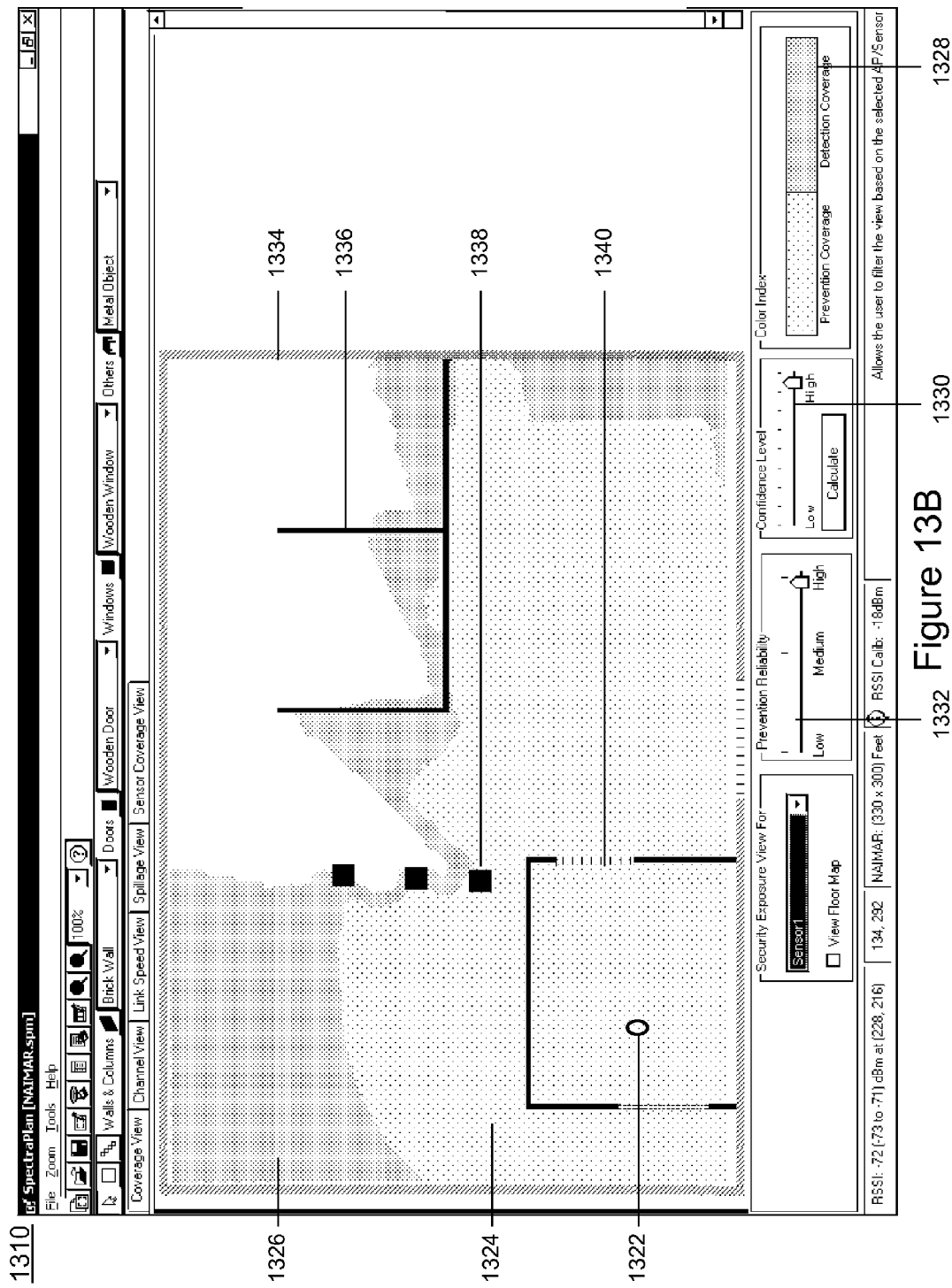
FIG. 13B illustrates an exemplary computer screenshot displaying sniffer coverage according to an embodiment of the present invention.

Referring to FIG. 13B, a sniffer icon is shown at location 1322. A layout is seen to comprise of exterior walls 1334, interior walls 1336, columns 1338, entrance 1340 etc. The detection region of coverage 1326 and the prevention region of coverage 1324 are shown simultaneously in relation to the display of the layout. In the present example, the detection region is seen to be larger than the prevention region. In a preferred embodiment, the regions 1324 and 1326 are shown by different colors, the legend 1328 for colors being provided. In an alternative embodiment, the regions 1324 and 1326 can be shown in separate views, each in relation to the display of the layout. In other alternative embodiments, the regions can be shown via different fill patterns, contours, gradations of one or more colors and like. The "Prevention Reliability" index 1332 is used to select the degree of disruption to be inflicted on the intruder device by the prevention process. In one specific embodiment, the degree of disruption corresponds to the packet loss rate to be inflicted on the intruder device. In this embodiment, an indication of statistical confidence in the coverage prediction is also indicated via the "Confidence Level" indicator 1330. In a further alternative embodiment, the coverage regions of a plurality of sniffers are shown in relation to the layout of the premises, e.g., via superposition of their coverage regions. Depending upon embodiments, the customer can be allowed to view, print, and/or electronically save the coverage views. Different fees can be charged for the various options. In various embodiments, fees can be charged for the use of RF module based upon the size of premises for which coverage prediction is to be performed (e.g., 10,000 square feet, number of floors etc.), number of sniffers, and types of coverage regions to be predicted (e.g., detection, prevention, location, redundancy etc.).

Certain additional details of RF visualization for sniffers can be found in commonly assigned patent application publication No. 20060058062, entitled "Method for wireless network security exposure visualization and scenario analysis", published on Mar. 16, 2006, which is hereby incorporated by reference herein. In an embodiment, one or more reports can be generated based upon the predicted coverage of APs and/or sniffers. The reports can indicate information such as percentage of areas covered by various signal strengths/link speeds, co-channel/adjacent channel interference etc. In an alternative embodiment, the customer is provided with a measurement tool (e.g., software running on a wireless enabled laptop, PDA etc.) using which signal strength measurements and other measurements can be taken on customer site. These measurements can be reported (e.g., uploaded) to the customer workspace on the security server. The security server can use the measurements by themselves or along with predictions to provide various RF visualization displays and reports. As merely an example, the measurements can be used to adjust the prediction parameters for improved accuracy.

In an embodiment, the service provider entity can provide services of professionals skilled in wireless vulnerability management. These professionals can assist the customer in selecting appropriate modules/submodules, in configuring various parameters and like. The professionals can also assist in acting on vulnerabilities and security breaches detected. In some embodiments, a service level agreement (SLA) can be executed between the service provider and the customer for professional services offering. Examples of SLAs can include analysis and notification of threats within a specified time limit, periodic reporting, periodic system configuration review, consultation for threat remediation and like.

The method 200 at step 214 includes metering usage of the workspace for wireless vulnerability management for the customer entity. Various embodiments of the present invention include various models for charging the customer entity for vulnerability management service, based upon the metered usage of the workspace. In an embodiment, the service provider entity can track usage parameters of the sniffers for wireless vulnerability management for a customer entity. Examples of the usage parameters of the sniffers include among others the number of sniffers, the duration for which each of the sniffers is active (e.g., connected to the security server and sending wireless activity information from customer site), the amount of wireless activity information received from the sniffers, number of channels scanned etc. The customer can be charged (e.g., periodically) subscription charges based upon the metered sniffer usage.

In alternative embodiment, the metering the usage of the workspace can include tracking number of vulnerabilities detected. Moreover, it can include tracking types and severities of the vulnerabilities detected. It can also include keeping track of actions taken in response to detected vulnerabilities, e.g., email sent, recorded in report, remediation triggered etc. The customer can be charged based upon these metered usage parameters. In an embodiment, the number of vulnerabilities detected during the selected period can comprise real vulnerabilities and false alarms. In this embodiment, credit can be given to the customer entity for at least a subset of the false alarms.

In yet an alternative embodiment, the metering can include tracking the selection of modules and/or submodules as in step 212 and/or tracking usage parameters associated with the modules/submodules and charging the customer based upon these parameters. In yet a further alternative embodiment, metering can be based upon parameters such as number of reports subscribed to, generation of reports, notification of reports, contents of reports etc. The charging can include pre-charging, deducting from deposit accounts, periodic billing, extending credit etc. In an embodiment, customer entity can be charged flat rate for wireless vulnerability management service for a selected period. In various embodiments, the flat rate can depend on the modules/submodules subscribed to, notification preferences, usage of sniffers, reports and like. The various metering embodiments described herein are exemplary only and there are many others including modifications and combinations of those described herein which will be apparent to persons of ordinary skill in the art based upon the present disclosure.

While several exemplary modules have been described (for example, at step 212 of the method 200), there are others which will be apparent to one of ordinary skill in the art based on the teachings of the present specification. In an embodiment according to the present invention, the customer can select one or more of the modules. The customer can pay for the wireless vulnerability management based upon the modules selected and/or duration for which they are used. In an embodiment, the customer can select certain modules when threat perception is high and deselect them when it is relatively lower. For example, the retailer can select to use and pay for the remediation module during the Christmas season when the threat perception is higher due to peak shopping season and turn it off during other low shopping activity seasons. As another example, the financial organization can increase the level of wireless security in response to the reports of spreading Internet worm. The modularization of wireless vulnerability management advantageously provides for efficient, affordable and flexible wireless vulnerability management. Moreover, the modules can comprise submodules. The submodules can also be selected (e.g., activated) and deselected (e.g., deactivated) in an embodiment. The metering can also be based upon the selected submodules.

In various embodiments of the present invention, the sniffer can monitor wireless activity in its vicinity. Wireless activity can include any transmission of control, management, or data packets between an AP and one or more wireless clients, or among one or more wireless clients. In general, the sniffer can listen to a radio channel and capture transmissions on that channel. In an embodiment, the sniffer can cycle through multiple radio channels on which wireless communication could take place. On each radio channel, the sniffer can wait and listen for any ongoing transmission. In an alternative embodiment, sniffer can operate on multiple radio channels simultaneously.

Whenever a transmission is detected, sniffer can collect and record the relevant information about that transmission. This information can include all or a subset of information from various fields in a captured packet. In an embodiment, a receive signal strength indicator (RSSI) associated with the captured packet can also be recorded. Other information such as the day and the time the transmission was detected can also be recorded.

The sniffer can perform processing on the information it gathers about wireless transmissions. For example, the sniffer can filter/summarize the information for sending it to the security server. The sniffer can perform certain threat assessment processing on the gathered information. Moreover, the sniffer can send information about results of the threat assessment processing to the security server.

Depending upon the embodiment, the sniffer can transmit packets over the wireless medium. These packet transmissions can facilitate blocking/disrupting wireless communication over undesirable wireless connections according to an aspect of the present invention. The packet transmissions can also facilitate certain threat assessment procedures.

Figure 6:
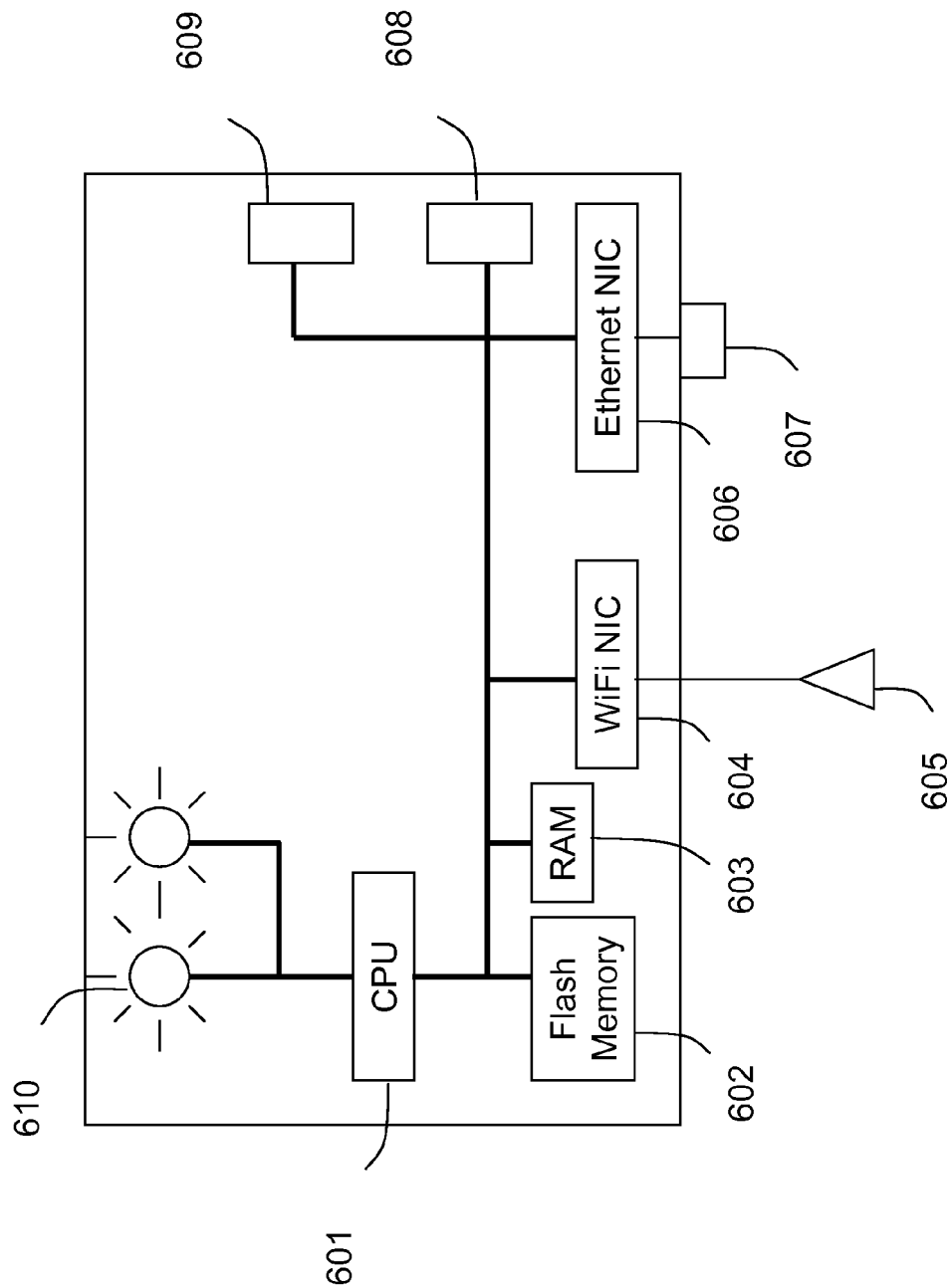
FIG. 6 illustrates an exemplary schematic diagram of sniffer device according to an embodiment of the present invention.

An exemplary hardware diagram of the sniffer 600 is shown in FIG. 6. This diagram is merely an example, which should not unduly limit the scope of the claims herein. One of ordinary skill in the art would recognize many variations, alternatives, and modifications. As shown, sniffer can have a central processing unit (CPU) 601, a flash memory 602 where the software code for sniffer functionality can reside, and a RAM 603 which can serve as volatile memory during program execution. The sniffer can have one or more 802.11 wireless network interface cards (NICs) 604 which perform radio and wireless MAC layer functionality and one or more of dual-band (i.e., for transmission detection in both the 2.4 GHz and 5 GHz radio frequency spectrums) antennas 605 coupled to the wireless NICs. Each of the wireless NICs 604 can operate in 802.11a, 802.11b, 802.11g, 802.11b/g or 802.11a/b/g mode. In an embodiment, alternatively or in addition, at least one of the NICs can operate in 802.11n mode. Moreover, the sniffer can have an Ethernet NIC 606 which performs Ethernet physical and MAC layer functions, an Ethernet jack 607 such as RJ-45 socket coupled to the Ethernet NIC for connecting the sniffer device to wired LAN with optional power over Ethernet or POE, and a serial port 608 which can be used to flash/configure/troubleshoot the sniffer device. A power input 609 is also provided. One or more light emitting diodes (LEDs) 610 can be provided on the sniffer device to convey visual indications (such as device working properly, error condition, undesirable wireless activity alert, and so on).

In an embodiment, the sniffer can be built using a hardware platform similar to that used to build an AP, although having different functionality and software. In an alternative embodiment, both the sniffer and the AP functionality can be provided in the same hardware platform.

In yet an alternative embodiment, the sniffer functionality is provided via a software that can be executed using general purpose computers such as for example laptops or desktops using microprosessor supplied by Intel Corporation of Santa Clara, Calif., an operating system supplied by Microsoft Corporation of Redmond, Wash. (e.g., Windows XP, Windows Vista etc.), and having either a built in (e.g., Centrino technology) or external (e.g., PCMCIA based) radio cards. Alternatively, the software can be executed on a wireless communications capable handheld devices such as iPhone (e.g., provided by Apple Computers of Cupertino, Calif.), PDAs, mobile phones etc. In this embodiment, the customer can download the software from the security server. The customer can specify the computer platform for which the software is desired. The software can have a license associated with it such as for example license to use the software. The license can indicate as to on how many computers the customer is allowed to install the software.

Figure 7:
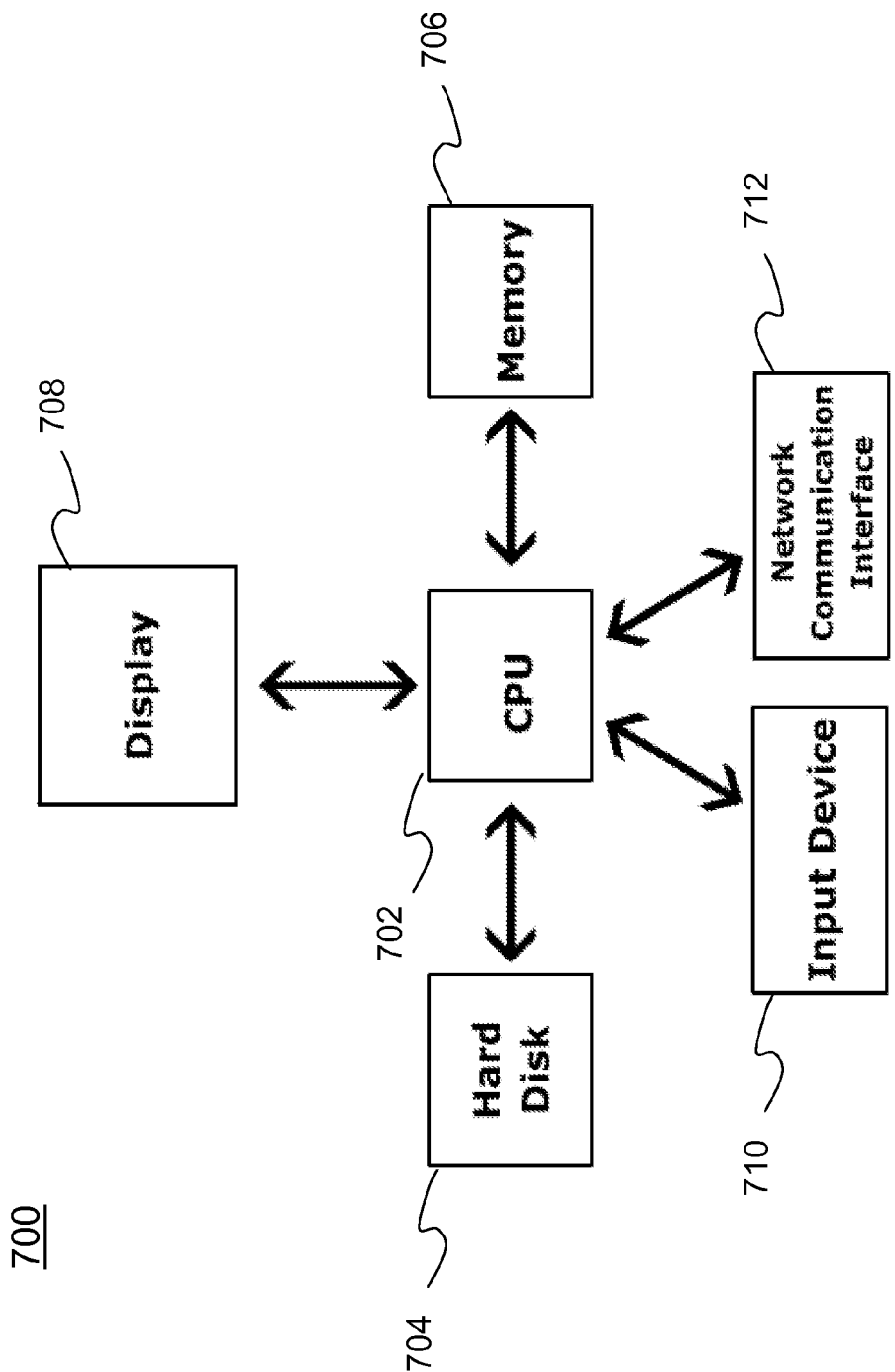
FIG. 7 illustrates an exemplary schematic diagram of security server system according to an embodiment of the present invention.

The security server according to an embodiment of the present invention can include a network appliance such as one provided by Intel Corporation of Santa Clara, Calif. or any other suitable computing platform. As merely an example, the computing platform can run enterprise grade server operating systems such as Windows Server 2003 provided by Microsoft Corporation of Redmond, Wash., Red Hat Enterprise Linux provided by Red Hat, Inc. of Raleigh, N.C. etc. A schematic diagram of the security sever system 700 according to an embodiment of the present invention is illustrated in FIG. 7. This diagram is merely an example, which should not unduly limit the scope of the claims. One of ordinary skill in the art would recognize many variations, alternatives, and modifications. As shown in FIG. 7, the security server can comprise a processing unit (CPU) 702, a hard disk 704, a memory device 706 which can comprise a read only memory (RAM), a display device 708, an input device 710 which can include a keyboard, a mouse etc., and a network communication interface 712 such as Ethernet interface, optical interface etc. In an embodiment the security server can comprise of a plurality of interconnected computers. The plurality of computers can use techniques such as clustering, parallel processing etc. to increase the processing and/or storage capacity of the security server.

One or more sniffers (e.g., such as the sniffer illustrated in FIG. 6) and one or more security servers (e.g., such as the security server illustrated in FIG. 7) can be used to implement the method for wireless vulnerability management (e.g., method 200 illustrated in FIG. 2). For example, the sniffers can monitor wireless transmissions within their vicinity. They report information associated with the monitored wireless transmissions to the security server over the Internet. The sniffers and/or the security server can perform processing on the information associated with the monitored wireless transmissions for threat assessment, location tracking and like. The sniffers can transmit wireless signals for certain remediation, threat assessment etc. The security server can store the information associated with the monitored wireless transmissions for reporting, forensics etc. Several more exemplary embodiments for wireless vulnerability management according to the present invention are described below.

Figure 8:
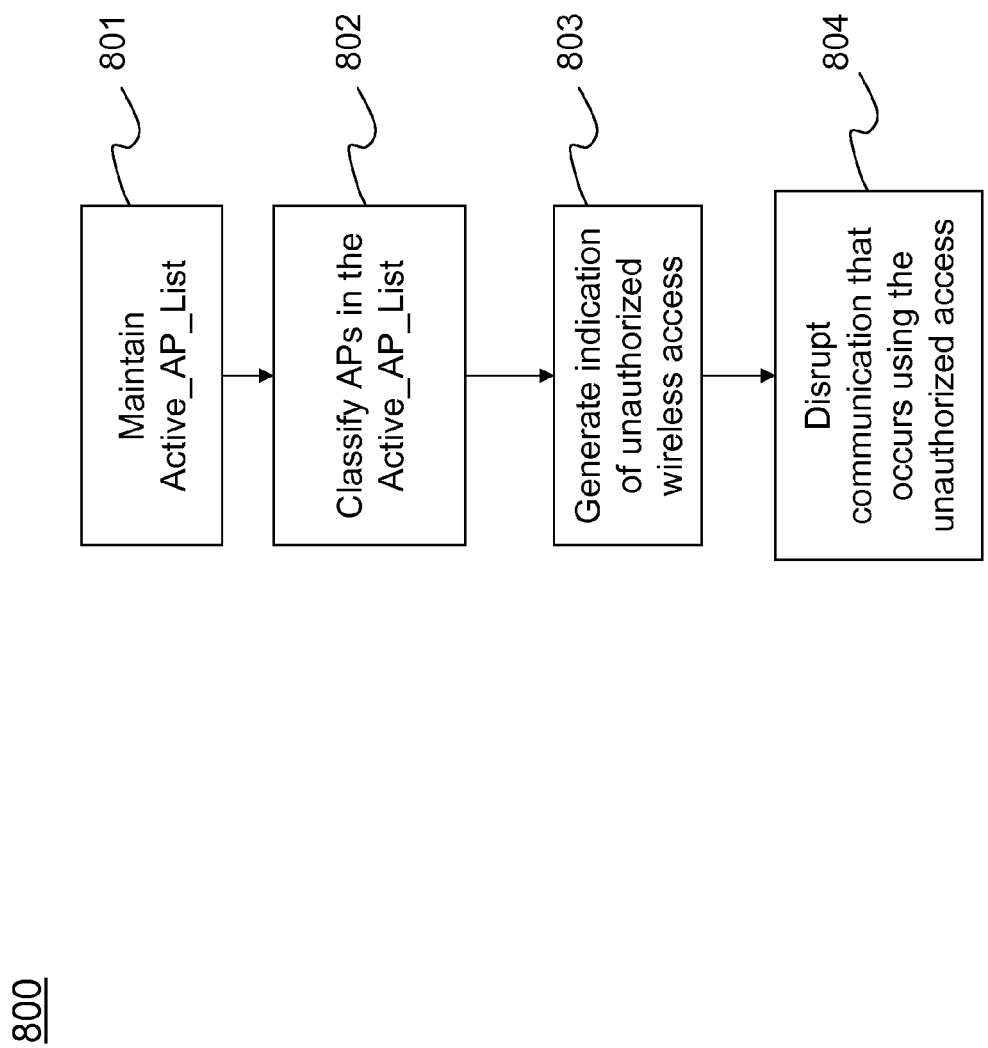
FIG. 8 illustrates an exemplary logical flow of steps in a method for certain wireless intrusion detection and prevention according to an embodiment of the present invention.

An exemplary logical flow of steps in certain wireless intrusion detection and prevention method 800 (e.g., for detecting unauthorized wireless access) according to an embodiment of the present invention is shown in FIG. 8. This diagram is merely an example, which should not unduly limit the scope of the invention. One of ordinary skill in the art would recognize other variations, modifications, and alternatives based on the teachings of the present specification.

Figure 9:
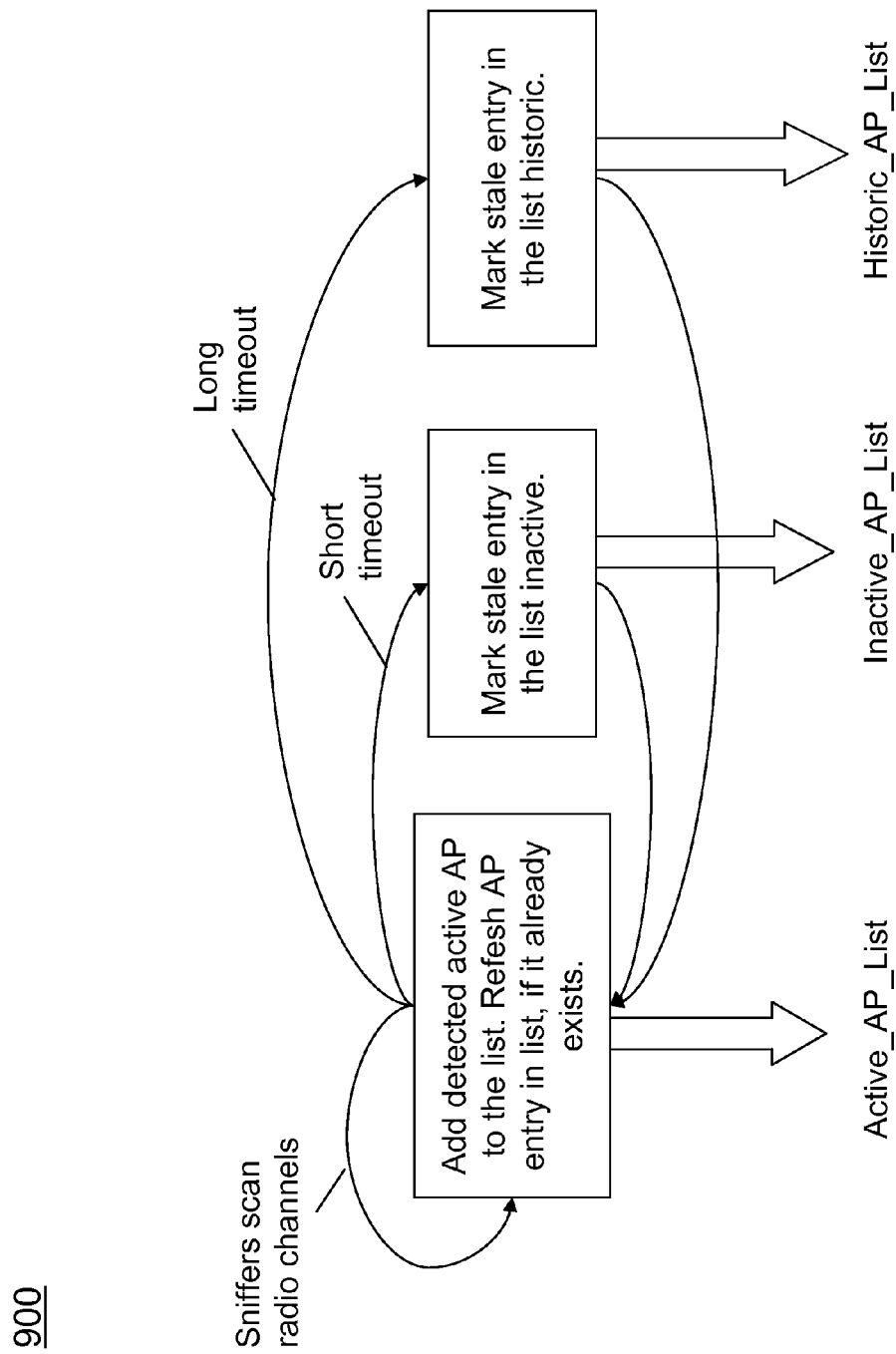
FIG. 9 illustrates an exemplary logical flow of steps in a certain method for maintaining list of active access points according to an embodiment of the present invention.

As shown, the first step 801 includes maintaining a list of active APs called the Active_AP_List. An active AP can be the AP that was recently involved in the wireless transmission as the sender or the receiver. An active AP can be detected by analyzing the wireless transmission on the radio channel captured by the sniffer. For example, every AP in the WiFi network periodically transmits a beacon packet for the client wireless stations to be able to connect to it. The beacon packet contains information such as clock synchronization data, AP's wireless MAC address (Basic Service Set Identifier (BSSID)), supported data rates, service set identifiers (SSIDs), parameters for the contention and contention-free access to the wireless medium, capabilities as regards QoS, security policy etc. In an embodiment, detection of beacon packet transmission from an AP is used to identify said AP to be an active AP. Beacon packet can be recognized from the type and subtype fields in the 802.11 MAC header of the beacon packet. In alternative embodiments, active AP can also be detected when any other wireless transmission (data, control or management packet) directed to or generating from it is observed by the sniffer. In yet a further alternative embodiment, identify of the active AP is received from other network systems. Whenever an active AP is detected (i.e., wirelessly active AP), it is added to the Active_AP_List. If the Active_AP_List already contains entry for said AP, the corresponding entry is refreshed. Associated with each entry in the Active_AP_List are a short timeout and a long timeout values. After a short timeout, the corresponding entry is marked "inactive" and after a long timeout it is marked "historic". An exemplary logical state diagram 900 for maintaining the Active_AP_List is shown in FIG. 9. This diagram is merely an example, which should not unduly limit the scope of the claims herein. One of ordinary skill in the art would recognize other variations, modifications, and alternatives.

The second step 802 in the method 800 is to classify the APs in Active_AP_List into: a) Authorized APs, b) Unauthorized APs, and c) External APs. In this embodiment, the Authorized APs are the APs which are allowed to be connected to the LAN by the network administrator. The Unauthorized APs are the APs that are not allowed to be connected to the LAN, but are still connected to the LAN. The Unauthorized APs pose a security threat as they can provide a way for intruders to wirelessly access the LAN resources. The External APs are the APs whose presence can be detected by the sniffers but they are not connected to the LAN. For example, these can be neighbor's APs whose radio coverage spills into the region of operation of the LAN. The External APs may not pose a security threat as they do not provide a way for intruders to access the LAN.

The third step 803 can generate an indication of unauthorized wireless access (e.g., intrusion alert) if an Unauthorized AP is identified in step 802. Once the intrusion alert is generated, the method sends an indication of the Unauthorized AP and/or intruding wireless station to a prevention process. Further details of the prevention process can be found throughout the present specification and more particularly below.

At step 804 certain action can be performed to disable or disrupt any communication between the Unauthorized AP and the intruding wireless station. One embodiment of this step works by preventing or breaking the "association" between the Unauthorized AP and the intruding wireless station. Association is certain procedure according to the IEEE 802.11 MAC protocol wherein the wireless station and the AP establish a wireless connection between them. Techniques for preventing or breaking the association between the Unauthorized AP and the intruding wireless client include among others sending one or more spoofed "deauthentication" packets from one or more sniffers with the Unauthorized AP's wireless MAC address as source address with a reason code "Authentication Expired" to the intruding wireless station's MAC address or to a broadcast address, sending one or more spoofed deauthentication packets from one or more sniffers to the Unauthorized AP with the intruding wireless station's wireless MAC address as source address with reason code "Auth Leave", sending one or more spoofed "disassociation" packets from one or more sniffers with the Unauthorized AP's wireless MAC address as source address to the intruding wireless station's MAC address or to a broadcast address, and sending one or more spoofed disassociation packets from one or more sniffers to the Unauthorized AP with the wireless client's wireless MAC address as source address.

Certain additional details about the prevention process can be found in the following patent applications/patent application publications, which are commonly assigned, and each of which is hereby incorporated by reference herein: U.S. Patent Application Publication No. 20060165073, entitled "Method and a system for regulating, disrupting and preventing access to the wireless medium", published on Jul. 27, 2006; U.S. patent application Ser. No. 11/026,473, entitled "Method and system for scheduling of sensor functions for monitoring of wireless communication activity", filed on Dec. 29, 2004; and U.S. patent application Ser. No. 11/330,948, entitled "Method and system for disrupting undesirable wireless communication of devices in computer networks", filed on Jan. 11, 2006.

In the preferred embodiment of the method of invention, step 802 can distinguish the APs that are connected to the LAN from those that are not connected to the LAN. This advantageously facilitates distinguishing between the Unauthorized APs and the External APs. The distinguishing between the Unauthorized APs and the External APs according to the present invention offers several benefits and/or advantages. For example, the distinguishing between the Unauthorized APs and the External APs can facilitate initiating intrusion prevention of step 804 in an automated fashion as the distinguishing as above can provide for avoiding disrupting neighbor's wireless network via intrusion prevention. As another example, the distinguishing between the Unauthorized APs and the External APs can provide for avoiding false alarms on intrusion. In a typical office environment, the sniffer can typically detect wireless communication associated with several APs other than the Authorized APs. Among these several APs other than the Authorized APs, some APs can be the External APs (e.g., APs in neighbor's wireless network, municipal WiFi APs etc.) and the others can be the Unauthorized APs (e.g., AP connected by unassuming or malicious employee to the LAN for providing unauthorized access to the LAN). With the ability to distinguish between the External APs and the Unauthorized APs, the security system can avoid raising intrusion alarms for External APs. This takes nuisance factor out of system operation as well as saves resources that would otherwise be wasted in chasing false intrusion alarms. Various embodiments to distinguish the APs that are connected to the LAN from those that are not connected to the LAN can employ correlation analysis between traffic detected over wired portion of the LAN and traffic detected over wireless medium.

Certain additional details about classifying the active APs can be found in the following patent applications/patent application publications/patents, commonly assigned, and each of which is hereby incorporated by reference herein: U.S. Patent Application Publication No. 20050195753, entitled "Method and system for detecting wireless access devices operably coupled to computer local area networks and related methods", published on Sep. 8, 2005; U.S. patent application Ser. No. 10/931,926, entitled "Automated method and system for monitoring local area computer networks for unauthorized wireless access", filed on Aug. 31, 2004; U.S. Patent Application Publication No. 20060193300, entitled "Method and apparatus for monitoring multiple network segments in local area networks for compliance with wireless security policy", published on Aug. 31, 2006; and U.S. Pat. No. 7,002,943, entitled "Method and system for monitoring a selected region of an airspace associated with local area networks of computing devices", issued on Feb. 21, 2006.

In an alternative exemplary embodiment, the system comprising sniffers and security server can provide certain protection to LANs including wireless networks which use outdated security controls such as WEP encryption. Certain organizations such as for example some retailers have already invested in equipment (e.g., handheld scanners) using WEP for wireless communication encryption. WEP encryption has been shown to be vulnerable to various attacks. Nonetheless, these organizations are forced to use WEP for wireless communication encryption as many of the handheld scanners do not support upgrading to the more robust encryption protocols.

Certain attack on WEP encrypted communication can crack the encryption key upon observing a certain number of encrypted packets. In a typical attack on WEP encryption, the attacker first collects a certain number of wireless packets (802.11 frames) that have been encrypted with an encryption key (which is unknown to the attacker to start with). The attacker can passively sniff such packets from wireless communication between the AP and its connected client. Alternatively, in order to expedite the collection of packets, the attacker can employ certain active injection techniques such as packet replays. The packet injection techniques prompt the AP and/or the client to send encrypted packets at a faster rate than what would be observed during their normal communication. Once a certain number of packets are collected, the WEP cracking algorithms such as one described by Fluhrer et al. in a paper titled "Weaknesses in the Key Scheduling Algorithm of RC4", which is also called as FMS attack (named after its discoverers Fluhrer, Mantin, and Shamir), can be run on the collected packets to infer the encryption key. Once encryption key is inferred, the attacker can eavesdrop and decrypt the wireless communication and can even get connected to the wireless network. The attacker can impersonate (e.g., spoof) the MAC address of an authorized client to remain undetected and/or get connected through APs which use MAC address based access control.

Figure 10:
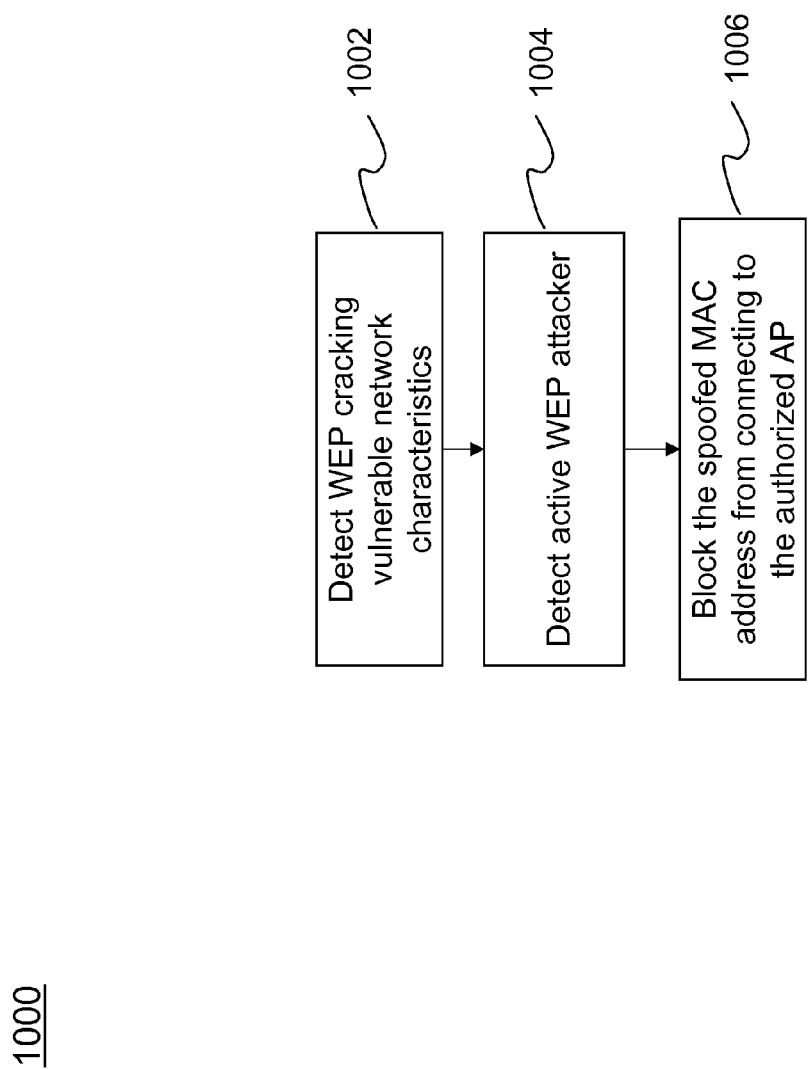
FIG. 10 illustrates an exemplary logical flow of steps in a certain method for protecting WEP communications according to an embodiment of the present invention.

In an embodiment, the present invention provides certain protection for WEP encrypted communications. An exemplary method 1000 for providing certain protection for WEP encrypted communications according to an embodiment of the present invention is illustrated in FIG. 10. This diagram is merely an example, which should not unduly limit the scope of the invention. One of ordinary skill in the art would recognize other variations, modifications, and alternatives based on the teachings of the present specification. As shown, the method can detect characteristics of the wireless network which simplify the WEP key cracking for the attacker (step 1002). For example, the FMS and certain other key cracking algorithms use certain values in the WEP encrypted packets called "weak IVs" (Initialization Vectors) for the key cracking. The system of present invention can generate alerts when weak IVs are detected in packets transmitted from devices in the authorized wireless networks. As yet another example, having certain setting for parameter called PSPF (Publicly Secure Packet Forwarding) on the authorized APs simplifies the active injection based attacks. The method and system of the present invention can generate notifications if such PSPF setting is detected on authorized AP.

As shown in FIG. 10, the method can detect the WEP attacker using active injection (step 1004). The presence of active injection attacker can be detected via detection of abnormally high volume of ARP request packets with the same value of IV in them being transmitted over the wireless channel of the AP. In this embodiment, the attacker captures a legitimate ARP request transmitted from the station, and replays it multiple times to extract ARP responses from the AP. Alternatively or in addition, occurrence of impersonation for the station's MAC address, often called as MAC address spoofing, can also be detected to infer the presence of active WEP attacker. According to certain technique to detect MAC address spoofing, packets including the MAC address as the source/transmitter of the packets are analyzed. More particularly, the sequence numbers included within the packets are analyzed. In the absence of MAC address spoofing, the sequence numbers typically increase with time in a regular fashion, i.e., until wraparound occurs. In the presence of station MAC spoofing, anomaly can be detected among sequence numbers. As merely an example, the sequence numbers can be seen to go forward and backward with time. Certain additional details about detecting MAC address spoofing can be found in the commonly assigned patent application Ser. No. 11/770,760, entitled "Method and system for detecting address rotation and related events in communication networks", filed on Jun. 29, 2007, which is hereby incorporated by reference herein.

The method 1000 can detect an attacker connecting to the authorized wireless network using the cracked key via detection of frames including spoofed client MAC address. The sniffers can block the client's MAC address from connecting to the AP (e.g., using deauthentication based prevention technique) (step 1006). This can foil the active injection based WEP attack and/or foil the attacker from connecting to the network using the cracked WEP encryption key. In an alternative embodiment, step 1006 can be performed even if active injection WEP cracking is not detected as in step 1004. This is to protect from passive WEP cracking attacker.

In yet an alternative exemplary embodiment, the system comprising sniffers and security servers can detect certain Man-in-the-Middle attacks, for example, which can be launched via a MAC spoofing process. In the MAC spoofing process, an attacker can operate an AP in a vicinity of the authorized wireless network which masquerades as an AP in the authorized wireless network, for example, by advertising the same identity information (e.g., wireless MAC address, SSID etc.) as that of the authorized AP. Moreover, the attacker AP can deploy techniques such as high gain antennas to increase its signal strength. Such an AP can lure stations in the authorized wireless network with or without their knowledge into connecting to it and then exploit the stations by acting as Man-in-the-Middle in the stations' wireless communication.

The method according an embodiment of the invention to detect MAC spoofing works by capturing beacon (or probe response) packets transmitted from an AP with a given MAC address, and recording values contained in the TSF (Time Stamp Field) of the beacon packets. The TSF is a 64-bit field in the IEEE 802.11 beacon packets that contains AP's timestamp. The TSF value represents value in microseconds and increments as the time progresses (for examples, by one count every microsecond interval). The TSF counter starts from zero every time the AP device is reset/(re)started. The method of present invention exploits this fact by computing an approximation to the reset/(re)start time of the AP device with a given MAC address from the TSF value contained in the captured beacon packet (e.g. reset/(re)start time=time instant the beacon packet from a given MAC address is captured–the TSF value), and detecting if reset/(re)start times computed for a given MAC address are apart from each other beyond reasonable margin of error (e.g. 1 second). If so, MAC spoofing (i.e., presence of attacker AP masquerading as authorized AP) is inferred.

Figure 11:
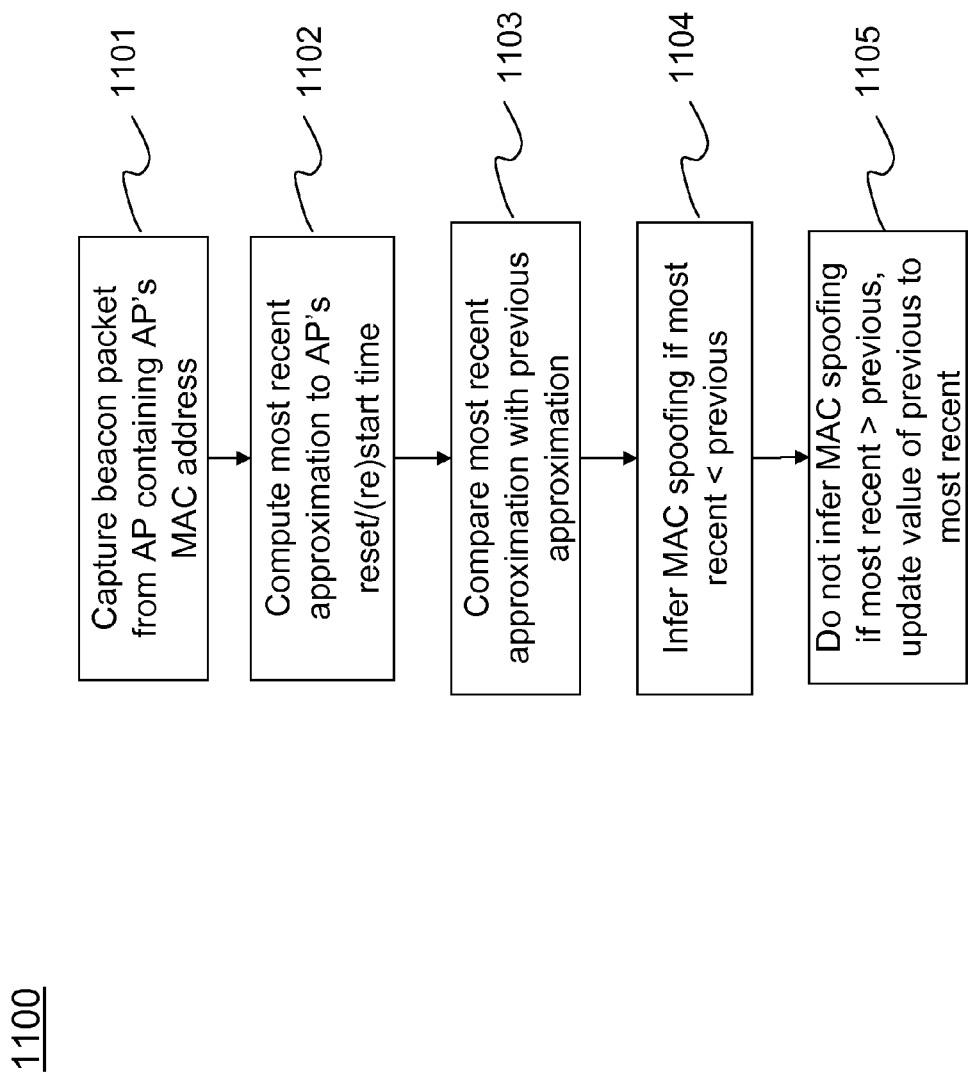
FIG. 11 illustrates an exemplary logical flow of steps in a certain method for detecting MAC address spoofing according to an embodiment of the present invention.

A method 1100 to detect MAC spoofing according to a specific embodiment is illustrated in FIG. 11. This diagram is merely an example, which should not unduly limit the scope of the claims herein. One of ordinary skill in the art would recognize many variations, modifications, and alternatives. The method advantageously eliminates false positives resulting from an authorized AP indeed undergoing a reset/(re)start operation. In step 1101, a beacon packet transmitted from an AP with a given MAC address is captured by the sniffer. In step 1102, a most recent approximation to reset/(re)start time of the AP with the given MAC address is computed as the capture time of the beacon packet minus the TSF value in the beacon packet. In step 1103, the most recent value of approximation is compared with the approximation value computed (and stored) from a beacon packet from the given MAC address captured by the sniffer in the past. Preferably, the comparison is done considering a reasonable margin of error, for example 1 second or 10 seconds. As shown in step 1104, if the most recent approximation value is found smaller than the past computed value, MAC spoofing is inferred. As shown in step 1105, if the most recent approximation value is found greater than the past computed value, MAC spoofing is not inferred so as to avoid false alarms due to reset/(re)start of an authorized AP.

Many alternative embodiments of the method to detect MAC spoofing are possible. In an embodiment, the hardware/software directed to execute the steps of the method are provided within a single sniffer. In an alternative embodiment, the foregoing method to detect MAC spoofing is performed in a distributed fashion. That is, information associated with or derived from TSF values in beacon packets from a given MAC address captured by plurality of sniffers is received by the security server and processed as described to detect MAC spoofing. The information associated with local reference times at different sniffers is used during the processing. The distributed operation advantageously detects MAC spoofing wherein the authorized AP and the attacker AP are within the radio coverage range of different sniffers, but none of these different sniffers is able to capture beacon packets from both of these APs. In an embodiment, when a spoofing is detected for a MAC address, the indication of the MAC address is passed to a prevention process.

Figure 12:
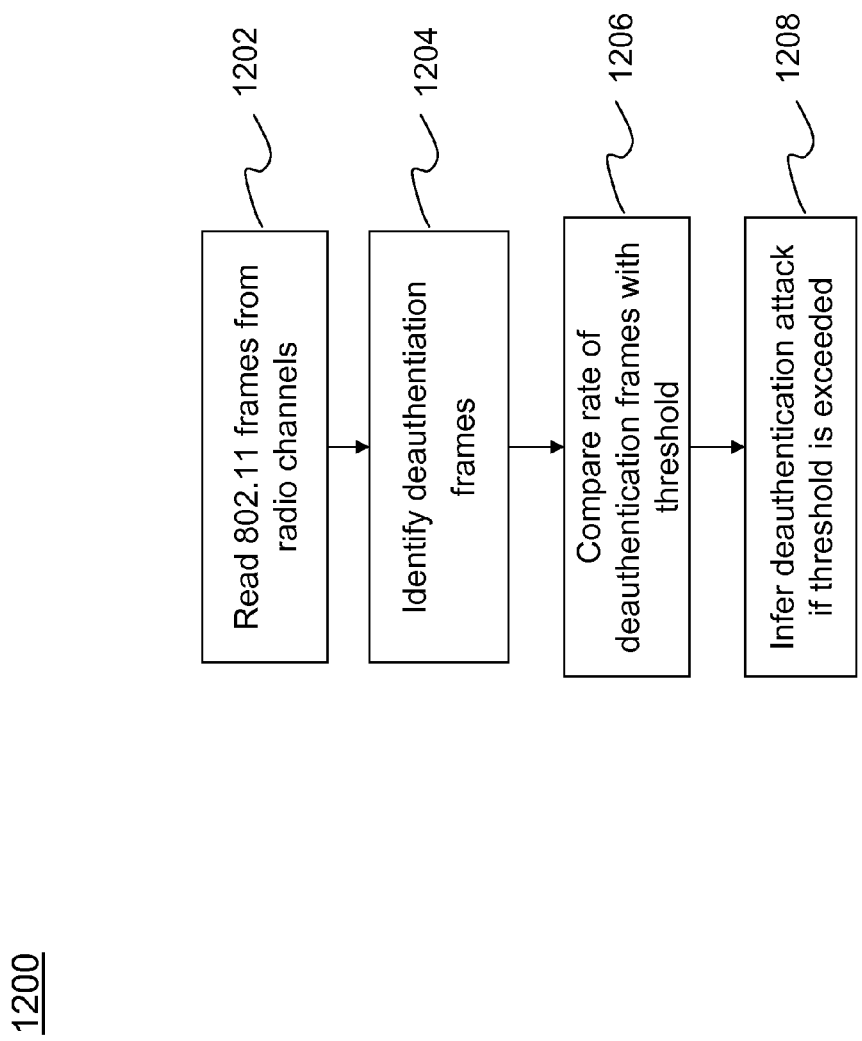
FIG. 12 illustrates an exemplary logical flow of steps in a method for detecting certain denial of service attack according to an embodiment of the present invention.

In yet a further alternative exemplary embodiment, the system comprising sniffers and security servers can detect certain DOS attacks. A logical flow of steps in a method 1200 for detecting certain deauthentication attack according to an embodiment of the present invention is illustrated in FIG. 12. This diagram is merely an example, which should not unduly limit the scope of the claims herein. One of ordinary skill in the art would recognize many variations, modifications, and alternatives.

As shown in FIG. 12, at step 1202, the sniffers scan radio channels and collect information about frames (an IEEE 802.11 format packet is often referred to as a frame) observed on those channels. At step 1204, a subset of frames among the observed frames that are of type "deauthentication" and include as source address a wireless MAC address of an authorized AP are identified. At step 1206, a number of such frames detected over a certain period of time is computed and compared against a predetermined threshold value. If a threshold is exceeded, at step 1208 an indication of deauthentication attack is generated. Certain additional details about detecting DOS attacks in wireless networks can be found in the U.S. patent application Ser. No. 11/770,760, entitled "Method and system for detecting address rotation and related events in communication networks", commonly assigned, which is hereby incorporated by reference herein.

In an embodiment, when a DOS attack is detected, the indication is passed to a prevention process. The prevention process can suppress the wireless transmissions of the DOS attacker to certain extent and facilitate legitimate communication to continue a certain extent. Certain additional details about the prevention process for DOS attacks can be found in the U.S. Patent Application Publication No. 20060165078, entitled "Method and system for allowing and preventing wireless devices to transmit wireless signals", published on Jul. 27, 2006, commonly assigned, which is hereby incorporated by reference herein.

The various embodiments of the present invention may be implemented using a computer based system. The computer based system may include a processing unit, an input device, a display unit, and a communication interface. The processing unit may include a microprocessor. The microprocessor may be connected to a data bus. The microprocessor may include any processor-based systems using microcontrollers, digital signal processors (DSP), reduced instruction set circuits (RISC), application specific integrated circuits (ASICs), logic circuits, and any other circuit or processor capable of executing the computer code (program) for performing the functions described herein. The computer based system may also include a memory. The memory may include Random Access Memory (RAM) and/or Read Only Memory (ROM). Alternatively or in addition, the memory may include one or more hard disks and/or one or more portable data storage devices such as floppy disk, compact disk, jump drive and the like. The memory can also be other similar means for storing computer programs, program data etc.

The computer code may include various commands that instruct the processing unit to perform specific operations such as the processes of the various embodiments of the present invention. The set of instructions may be in the form of a software program. The software may be in various forms such as system software or application software. Further, the software may be in the form of a collection of separate programs, a program module within a larger program, or a portion of a program module. The software also may include modular programming in the form of object-oriented programming. The processing of input data by the processing unit may be in response to user commands, or in response to results of previous processing, or in response to a request made by another processing unit.

Although specific embodiments of the present invention have been described, it will be understood by those of ordinary skill in the art that there are other embodiments that are equivalent to the described embodiments. Accordingly, it is to be understood that the invention is not to be limited by the specific illustrated embodiments, but only by the scope of the appended claims.

What is claimed is:

1. A Software-as-a-Service (SaaS) based method for providing wireless vulnerability management for local area computer networks, the method comprising:

providing a security server, the security server being hosted by a service provider entity, the security server being coupled to the Internet and having an address in the Internet, the security server being adapted to provide analysis of data associated with wireless vulnerability management, concurrently for a plurality of local area computer networks of a plurality of distinct customer entities, respectively;

creating a first workspace for wireless vulnerability management for a first customer entity and a second workspace for wireless vulnerability management for a second customer entity on the security server, the creating the workspace being responsive to a first request from the first customer entity and a second request from the second customer entity to subscribe to wireless vulnerability management, the first and the second customer entities being distinct from one another;

receiving configuration information associated with the first workspace for the first customer entity at the security server, the configuration information including identification of a first physical location hierarchy associated with premises of the first customer entity;

receiving configuration information associated with the second workspace for the second customer entity at the security server, the configuration information including identification of a second physical location hierarchy associated with premises of the second customer entity;

associating identities of a first one or more sniffers to be utilized for wireless vulnerability management for the first customer entity with the first workspace and identities of a second one or more sniffers to be utilized for wireless vulnerability management for the second customer entity with the second workspace;

supplying the first one or more sniffers to the first customer entity and the second one or more sniffers to the second customer entity;

receiving a plurality of connection requests at the security server over the Internet from a plurality of sniffers, respectively, subsequent to the plurality of sniffers being deployed at premises of their respective customer entities;

identifying automatically from the plurality of connection requests a first set of connection requests associated with the first customer entity based at least upon the identities of the first one or more sniffers associated with the first workspace and a second set of connection requests associated with the second customer entity based at least upon the identities of the second one or more sniffers associated with the second workspace;

displaying the first one or more sniffers as active within the first workspace for the first customer entity and the second one or more sniffers as active within the second workspace for the second customer entity, based at least upon the identified first and second set of connection requests;

receiving input from the first customer entity for associating the first one or more sniffers with one or more locations, respectively, in the first physical location hierarchy associated with the first workspace for the first customer entity;

receiving input from the second customer entity for associating the second one or more sniffers with one or more locations, respectively, in the second physical location hierarchy associated with the second workspace for the second customer entity;

receiving at the security server a first information associated with wireless activity monitored by the first one or more sniffers at premises of the first customer entity, the receiving being receiving over the Internet;

processing the received first information associated with wireless activity within the first workspace for the first customer entity using the security server;

receiving at the security server a second information associated with wireless activity monitored by the second one or more sniffers at premises of the second customer entity, the receiving being receiving over the Internet;

processing the received second information associated with wireless activity within the second workspace for the second customer entity using the security server; and metering usage of the first workspace and the second workspace for wireless vulnerability management for the first customer entity and the second customer entity, respectively.

2. The method of claim 1 wherein the service provider entity, the second customer entity, and the first customer entity being business entities separate from one another.

3. The method of claim 1 wherein the metering the usage of the workspace for the first customer entity and the second customer entity comprising:

tracking usage of the first and the second one or more sniffers at premises of the first customer entity and the second customer entity, respectively, for monitoring of wireless activity; and charging the first customer entity and the second customer entity periodically based at least upon the usage of the first and the second one or more sniffers, respectively.

4. The method of claim 1 wherein the metering the usage of the workspace for the first customer entity and the second customer entity comprising:

tracking vulnerabilities detected during a first selected period within the first workspace and a second selected period within the second workspace; and charging the first customer entity and the second customer entity based at least upon the vulnerabilities detected during the first selected period and the second selected period, respectively.

5. The method of claim 1, and further comprising receiving a selection of one or more modules associated with the first workspace for the first customer entity at the security server.

6. The method of claim 5 wherein the metering the usage of the workspace for the first customer entity comprising charging the first customer entity based at least upon the selection of the one or more modules.

7. The method of claim 5 wherein the one or more modules comprise at least one module selected from the group consisting of scanning module, threat assessment module, remediation module, location tracking module, reporting module, RF visualization module, and managed services module.

8. The method of claim 5 wherein the receiving the selection of the one or more modules associated with the first workspace for the first customer entity at the security server comprising:

receiving a request to initiate logging into the first workspace for the first customer entity from a computer, the request being initiated over the Internet;

transferring information associated with a listing of modules comprising the one or more modules to the computer over the Internet; and receiving the selection of the one or more modules at the security server over the Internet, the selection being inputted by a person operating the computer using the listing of the modules.

9. The method of claim 5 wherein the processing the received first information associated with wireless activity within the first workspace for the first customer entity using the security server comprising:

authenticating the received first information using a digital secret shared between the security server and the first customer entity;

accessing the configuration information associated with the workspace for the first customer entity;

accessing the module selection information associated with the workspace for the first customer entity;

processing the received information based at least upon the configuration information and the module selection information to generate a result information; and triggering one or more actions based at least upon the result information.

10. The method of claim 1 wherein the receiving the configuration information associated with the first workspace for the first customer entity at the security server further comprising receiving identity information associated with one or more authorized wireless devices within the local area network of the first customer entity.

11. The method of claim 1 wherein the receiving the configuration information associated with the first workspace for the first customer entity at the security server further comprising receiving information associated with notification of one or more wireless vulnerabilities to the first customer entity.

12. The method of claim 1 wherein the receiving the configuration information associated with the workspace for the first customer entity at the security server further comprising receiving information associated with a selection of one or more reports, the one or more reports to be generated based upon the first information associated with wireless activity received at the security server.

13. The method of claim 1 wherein the receiving the configuration information associated with the first workspace for the first customer entity at the security server comprising:

receiving a request to initiate logging into the first workspace of the first customer entity from a computer, the request being initiated over the Internet;

transferring information associated with one or more configuration screens to the computer over the Internet;

displaying the one or more configuration screens on the computer; and receiving the configuration information at the security server over the Internet, the configuration information being inputted by a person operating the computer using the one or more configuration screens displayed on the computer.

14. The method of claim 1 wherein a username, a password, and an administrative privilege being associated with the first workspace for a plurality of administrators belonging to the first customer entity on the security server, wherein a first administrator having a configuration modification privilege, a second administrator having a viewing privilege, and a third administrator having a module selection privilege.

15. The method of claim 1 wherein the first information associated with wireless activity monitored by the first one or more sniffers at premises of the first customer entity including identities of one or more wirelessly active access points and one or more wirelessly active clients within and/or in a vicinity of the premises of the first customer entity.

16. The method of claim 1 wherein the first information associated with wireless activity monitored by the first one or more sniffers at premises of the first customer entity including information associated with wireless connections among a plurality of wireless devices within and/or in a vicinity of the premises of the first customer entity.

17. The method of claim 1 wherein the first information associated with wireless activity monitored by the first one or more sniffers at the premises of the first customer entity including information associated with radio signal strength parameters associated with wireless activity at the premises of the first customer entity.

18. A server computer apparatus for providing wireless vulnerability management, the apparatus comprising:
  a memory unit storing computer executable instructions;
  a processor unit for executing the computer executable instructions; and
  a communication interface for coupling the server computer device to the Internet and having an address in the Internet;
  wherein the computer executable instructions are programmed to provide analysis of data associated with wireless vulnerability management, concurrently for a plurality of local area computer networks of a plurality of distinct customer entities, respectively, by performing the steps of:
    creating a first workspace for wireless vulnerability management for a first customer entity and a second workspace for wireless vulnerability management for a second customer entity on the security server, the creating the workspace being responsive to a first request from the first customer entity and a second request from the second customer entity to subscribe to wireless vulnerability management, the first and the second customer entities being distinct from one another;
    receiving configuration information associated with the first workspace for the first customer entity at the security server, the configuration information including identification of a first physical location hierarchy associated with premises of the first customer entity;
    receiving configuration information associated with the second workspace for the second customer entity at the security server, the configuration information including identification of a second physical location hierarchy associated with premises of the second customer entity;
    associating identities of a first one or more sniffers to be utilized for wireless vulnerability management for the first customer entity with the first workspace and identities of a second one or more sniffers to be utilized for wireless vulnerability management for the second customer entity with the second workspace;
    receiving a plurality of connection requests at the security server over the Internet from a plurality of sniffers, respectively, subsequent to the plurality of sniffers being deployed at premises of their respective customer entities;
    identifying automatically from the plurality of connection requests a first set of connection requests associated with the first customer entity based at least upon the identities of the first one or more sniffers associated with the first workspace and a second set of connection requests associated with the second customer entity based at least upon the identities of the second one or more sniffers associated with the second workspace;
    displaying the first one or more sniffers as active within the first workspace for the first customer entity and the second one or more sniffers as active within the second workspace for the second customer entity, based at least upon the identified first and second set of connection requests;
    receiving input from the first customer entity for associating the first one or more sniffers with one or more locations, respectively, in the first physical location hierarchy associated with the first workspace for the first customer entity;
    receiving input from the second customer entity for associating the second one or more sniffers with one or more locations, respectively, in the second physical location hierarchy associated with the second workspace for the second customer entity;
    receiving at the security server a first information associated with wireless activity monitored by the first one or more sniffers at premises of the first customer entity, the receiving being receiving over the Internet;
    processing the received first information associated with wireless activity within the first workspace for the first customer entity using the security server;
    receiving at the security server a second information associated with wireless activity monitored by the second one or more sniffers at premises of the second customer entity, the receiving being receiving over the Internet;
    processing the received second information associated with wireless activity within the second workspace for the second customer entity using the security server; and
    metering usage of the first workspace and the second workspace for wireless vulnerability management for the first customer entity and the second customer entity, respectively.

19. The system of claim 18 wherein the server computer apparatus is hosted by a service provider entity, wherein the service provider entity, the second customer entity, and the first customer entity being business entities separate from one another.

* * * * *

(12) EX PARTE REEXAMINATION CERTIFICATE (34th)
Ex Parte Reexamination Ordered under 35 U.S.C. 257

United States Patent
Palnitkar et al.

(10) Number: US 8,032,939 C1
(45) Certificate Issued: Jul. 20, 2015

(54) METHOD AND SYSTEM FOR PROVIDING WIRELESS VULNERABILITY MANAGEMENT FOR LOCAL AREA COMPUTER NETWORKS

(75) Inventors: Samir Palnitkar, Ashburn, VA (US); Vivek Bhagwat, Pune, IN (US)

(73) Assignee: AIRTIGHT NETWORKS, INC., Mountain View, CA (US)

Supplemental Examination Request:
No. 96/000,091, Jan. 30, 2015

Reexamination Certificate for:
Patent No.: 8,032,939
Issued: Oct. 4, 2011
Appl. No.: 11/956,357
Filed: Dec. 14, 2007

Related U.S. Application Data

(63) Continuation-in-part of application No. 11/954,007, filed on Dec. 11, 2007, now abandoned.

(60) Provisional application No. 60/985,652, filed on Nov. 6, 2007.

(51) Int. Cl.
| G06Q 20/40 | (2012.01) |
| G06Q 30/02 | (2012.01) |
| H04W 12/12 | (2009.01) |
| G06Q 20/14 | (2012.01) |
| H04L 29/06 | (2006.01) |
| G06Q 20/10 | (2012.01) |
| H04W 12/10 | (2009.01) |

(52) U.S. Cl.
CPC ............... *G06Q 20/40* (2013.01); *G06Q 20/10* (2013.01); *G06Q 20/145* (2013.01); *G06Q 30/0283* (2013.01); *H04L 63/08* (2013.01); *H04L 63/1433* (2013.01); *H04W 12/10* (2013.01); *H04W 12/12* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,091, please refer to the USPTO's public Patent Application Information Retrieval (PAIR) system under the Display References tab.

*Primary Examiner* — Eric B Kiss

(57) ABSTRACT

A Software-as-a-Service (SaaS) based method for providing wireless vulnerability management for local area computer networks. The method includes providing a security server being hosted by a service provider entity to provide analysis of data associated with wireless vulnerability management for a plurality of local area computer networks of a plurality of customer entities, respectively. The method includes creating a workspace for wireless vulnerability management for a customer entity on the security server and receiving configuration information associated with the workspace. The method also includes supplying one or more sniffers to the customer entity. The method includes receiving at the security server information associated with wireless activity monitored by the one or more sniffers at premises of the customer entity and processing the received information within the workspace for the customer entity using the security server. The method includes metering usage of the workspace for wireless vulnerability management for the customer entity.

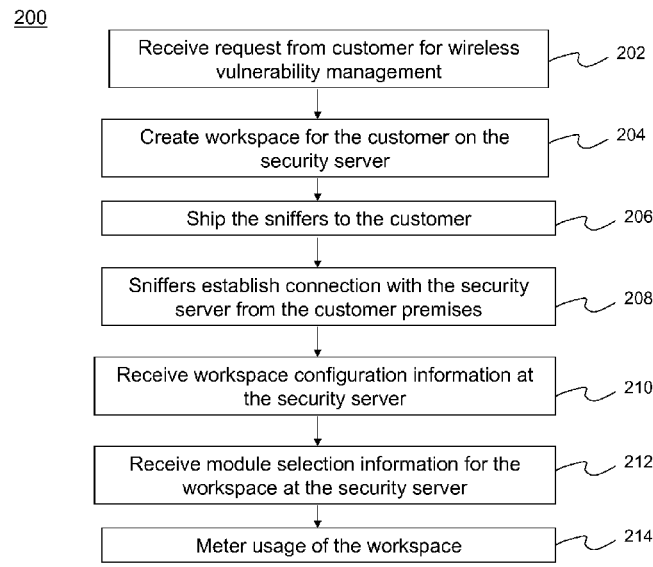

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *